United States Patent
Ma et al.

(10) Patent No.: US 12,044,625 B2
(45) Date of Patent: Jul. 23, 2024

(54) SYSTEMS AND METHODS FOR ROBUST BACKGROUND CORRECTION AND/OR EMITTER LOCALIZATION FOR SUPER-RESOLUTION LOCALIZATION MICROSCOPY

(71) Applicant: UNIVERSITY OF PITTSBURGH—OF THE COMMONWEALTH SYSTEM OF HIGHER EDUCATION, Pittsburgh, PA (US)

(72) Inventors: Hongqiang Ma, Pittsburgh, PA (US); Yang Liu, Sewickley, PA (US)

(73) Assignee: University of Pittsburgh—Of the Commonwealth System of Higher Education, Pittsburgh, PA (US)

( * ) Notice: Subject to any disclaimer, the term of this patent is extended or adjusted under 35 U.S.C. 154(b) by 1025 days.

(21) Appl. No.: 16/965,320

(22) PCT Filed: Jan. 18, 2019

(86) PCT No.: PCT/US2019/014131
§ 371 (c)(1),
(2) Date: Jul. 28, 2020

(87) PCT Pub. No.: WO2019/152216
PCT Pub. Date: Aug. 8, 2019

(65) Prior Publication Data
US 2021/0116380 A1 Apr. 22, 2021

Related U.S. Application Data

(60) Provisional application No. 62/745,726, filed on Oct. 15, 2018, provisional application No. 62/624,932, filed on Feb. 1, 2018.

(51) Int. Cl.
*G01N 21/64* (2006.01)
*G02B 21/16* (2006.01)
(Continued)

(52) U.S. Cl.
CPC ......... *G01N 21/6458* (2013.01); *G02B 21/16* (2013.01); *G02B 21/367* (2013.01);
(Continued)

(58) Field of Classification Search
CPC ......... G01N 21/6458; G06T 7/97; G06T 7/10; G06T 7/174; G06T 2207/10056;
(Continued)

(56) References Cited

U.S. PATENT DOCUMENTS 6,430,318 B1  8/2002 Florent et al.
2008/0205724 A1  8/2008 Cocosco et al.
(Continued)

FOREIGN PATENT DOCUMENTS

WO  2012021443 A2  2/2012
WO  2017223206 A1  12/2017

OTHER PUBLICATIONS

Zinchuk, V., Wu, Y., Grossenbacher-Zinchuk, O. et al. Quantifying spatial correlations of fluorescent markers using enhanced background reduction with protein proximity index and correlation coefficient estimations. Nat Protoc 6, 1554-1567 (2011). https://doi.org/10.1038/nprot.2011.384 (Year: 2011).*

(Continued)

*Primary Examiner* — Uzma Alam
*Assistant Examiner* — Jonathon Cook
(74) *Attorney, Agent, or Firm* — Philip E. Levy; Eckert Seamans Cherin & Mellott, LLC

(57) ABSTRACT

A background correction method for a fluorescence microscopy system includes receiving a raw image stack, determining a number of temporal minimum intensity values for (Continued)

each pixel location from the raw image stack, and calculating an expected background value for each pixel location based on the number of temporal minimum intensity values for the pixel location. Also, an emitter localization method includes receiving a raw image stack, determining a rough position of each of a plurality of emitters within the raw image stack by employing a linear deconvolution process, and determining a precise position of each of the plurality of emitters by employing the rough position of the emitter and gradient fitting.

20 Claims, 13 Drawing Sheets

(51) Int. Cl.
  *G02B 21/36* (2006.01)
  *G06T 7/00* (2017.01)
(52) U.S. Cl.
  CPC ...... *G06T 7/97* (2017.01); *G06T 2207/10056* (2013.01); *G06T 2207/10064* (2013.01)
(58) Field of Classification Search
  CPC .......... G06T 2207/10064; G02B 21/16; G02B 21/367; G01J 3/4406
  See application file for complete search history.

(56) References Cited

U.S. PATENT DOCUMENTS

2010/0278400 A1* 11/2010 Piestun .............. G02B 21/0076
  359/368
2012/0169842 A1* 7/2012 Chuang .................. H04N 7/181
  348/E7.001
2015/0098126 A1 4/2015 Keller et al.
2017/0053378 A1 2/2017 Chen et al.
2017/0175174 A1 6/2017 Chiu et al.
2019/0237160 A1* 8/2019 Rothberg ............... G16B 30/10

OTHER PUBLICATIONS

Salmon, J., Harmany, Z., Deledalle, CA. et al. Poisson Noise Reduction with Non-local PCA. J Math Imaging Vis 48, 279-294 (2014). https://doi.org/10.1007/s10851-013-0435-6 (Year: 2014).*
Hoogendoorn et al., The fidelity of stochastic single-molecule super-resolution reconstructions critically depends upon robust background estimation, Scientific Reports | 4 : 3854 | DOI: 10.1038/srep03854.
Ma et al., Fast and Precise 3D Fluorophore Localization based on Gradient Fitting, Scientific Reports | 5:14335 | DOI: 10.1038/srep14335.
Mukamel et al., Statistical Deconvolution for Superresolution Fluorescence Microscopy, Biophysical Journal vol. 102 May 2012 2391-2400.
Ma et al., WindSTORM: Robust online image processing for high-throughput nanoscopy, Sci. Adv. 2019, 5:eaaw0683, pp. 1-10, Apr. 26, 2019.
Ma, et al., Supplementary Materials for WindSTORM: Robust online image processing for high-throughput nanoscopy advances. sciencemag.org/cgi/content/full/5/4/eaaw0683/DC1.
Ma et al., Enhanced super-resolution microscopy by extreme value based emitter recovery, https://doi.org/10.1101/295261.
Ma et al., Supplementary Materials for Enhanced super-resolution microscopy by extreme value based emitter recovery.

* cited by examiner

SYSTEMS AND METHODS FOR ROBUST BACKGROUND CORRECTION AND/OR EMITTER LOCALIZATION FOR SUPER-RESOLUTION LOCALIZATION MICROSCOPY

CROSS-REFERENCE TO RELATED APPLICATIONS

This application is a U.S. National Stage Application under 35 U.S.C. § 371 of PCT International Application No. PCT/US2019/014131, filed on Jan. 18, 2019, entitled "SYSTEMS AND METHODS FOR ROBUST BACKGROUND CORRECTION AND/OR EMITTER LOCALIZATION FOR SUPER-RESOLUTION LOCALIZATION MICROSCOPY" which claims priority under 35 U.S.C. § 119(e) from U.S. Provisional Patent Application No. 62/624,932, filed on Feb. 1, 2018 and U.S. Provisional Patent Application No. 62/745,726, filed on Oct. 15, 2018, the contents of which are incorporated herein by reference.

GOVERNMENT CONTRACT

This invention was made with government support under grant #s EB016657 and CA185363 awarded by the National Institutes of Health (NIH). The government has certain rights in the invention.

BACKGROUND OF THE INVENTION

1. Field of the Invention

The present invention relates to super-resolution localization microscopy, and, in particular, to a systems and methods for robust background correction and/or localization of emitters for super-resolution localization microscopy.

2. Description of the Related Art

A fluorescence microscope is an optical microscope that uses fluorescence and phosphorescence instead of, or in addition to, reflection and absorption of light to study the properties of organic or inorganic substances. Fluorescence microscopy is one of the most widely used techniques to probe nanoscale macromolecular interactions, and may be used for both in vitro and in vivo imaging, such as single-particle tracking and super-resolution imaging. However, in conventional fluorescence microscopy, the raw image acquired by the camera of the fluorescence microscopy system is diffraction-limited. As a result, the resolution of such conventional fluorescence microscopy systems is limited (such systems typically have a resolution of about 200 nm).

Localization microscopy, also known as localization-based super-resolution imaging, is a particular technique for enhancing conventional fluorescence microscopy by enabling much higher resolution. Localization microscopy is based on the precise determination of the positions of single fluorescent molecules in a sample, and enables very high structural resolution in biological samples (e.g., down to the range of 20 nm or less). Example localization microscopy techniques include stochastic optical reconstruction microscopy (STORM), photo-activated localization microscopy (PALM), and fluorescence photo-activated localization microscopy (FPALM). In these techniques, special photo-activatable or photoswitchable fluorophores are used to achieve optical isolation of single molecule signals by switching the fluorophores between a "bright" and a "dark" state. In particular, the precise positions of the fluorophores are determined by fitting a model function to the detected single molecule signals. Typically, a very large number (e.g., several thousands to millions) of molecule positions are required for the reconstruction of a super-resolution image using these localization microscopy techniques. As a result, these localization microscopy techniques require the acquisition of raw image data stacks consisting of several thousand image frames that are recorded within a particular, relatively short timeframe (e.g., seconds up to several minutes).

As noted above, in localization microscopy, a small subset of the densely labeled fluorophores is sequentially switched "on" ("bright") to achieve sparsely distributed single fluorescent emitters at each image frame. Then, the centers of the sparsely distributed single fluorescent emitters are determined by a localization algorithm at nanometer precision. There are many known mathematical localization algorithms (e.g., least-square Gaussian fitting, center-of-mass) for precisely localizing the center of each emitter, and these algorithms directly determine the image resolution.

After accumulating localized positions from a sufficiently large number of image frames (typically 5,000-40,000 frames), a final reconstructed image is generated. The final reconstructed image typically improves the resolution by as much as 10 times.

The super-resolved imaging capability of localization microscopy is achieved based on the precise localization of individual fluorescent emitters. Therefore, the quality of the reconstructed super-resolution image can be profoundly affected by how accurately the single emitters can be localized via the localization algorithm. Current localization algorithms achieve the best accuracy when the raw image contains bright molecules on a uniform background. However, in real conditions, the raw image typically contains a heterogeneous background, which can vary across different samples. Such background fluorescence can introduce significant localization inaccuracies of up to tens of nanometers and result in image artifacts (i.e., misrepresentation of samples' structure), localization bias (i.e., shift the true positions of localized emitters), or reduced resolution, all of which can greatly affect the quality of the final reconstructed image.

In order to address this problem, a background correction algorithm may be used to estimate the non-uniform background (e.g., at each pixel location within the raw image data stacks) and recover the true emitter signal from the unwanted high and heterogeneous background signal. A number of prior art background correction algorithms are known, including a temporal median filter (MED) technique and rolling ball filter (RB) technique. These known techniques, however, have drawbacks and limitations, and only provide a rough estimation of the background. For example, the MED technique tends to show reduced emitter size and intensity due to background over-correction, and the RB technique tends to exhibit residual features from the structured background that result in erroneously localized emitters.

Accurate and robust background estimation would significantly improve the accuracy of subsequent emitter localization. There is thus a need for improved background estimation techniques that improve localization accuracy and image fidelity.

Moreover, in the past decade, many high-density localization algorithms have been developed to improve the temporal resolution of super-resolution localization microscopy. When combined with fast sCMOS cameras, sub-second temporal resolution can be realized. However, the high-density localization approach is not as widely used as sparse single-molecule localization microscopy, in part due to the extremely slow computation speed. Although online image analysis has been realized with high-speed single emitter localization algorithms, it remains difficult for dense emitter scenarios. As high-density localization algorithms are based on sophisticated statistical modelling and time-consuming iterative optimization procedures, the computation time to reconstruct a super-resolution image is often orders of magnitude longer than that of sparse emitter localization algorithms. When a large field of view or long temporal sequence is required, it can be as long as several days to process those large datasets on a personal computer. Therefore, investigators have to routinely use expensive super-computers or cloud-based computing platforms to reduce the computation time.

There is thus also a need for an improved emitter localization technique to enable high-speed and high-density localization for high-throughput super-resolution microscopy applications.

SUMMARY OF THE INVENTION

In one embodiment, a background correction method for a fluorescence microscopy system is provided that includes receiving a raw image stack generated by the fluorescence microscopy system, the raw image stack having a plurality of pixel locations associated therewith and comprising a plurality of temporally spaced image frames of a sample, determining a number of temporal minimum intensity values for each pixel location from the raw image stack, and calculating an expected background value for each pixel location based on the number of temporal minimum intensity values for the pixel location.

In another embodiment, a fluorescence microscopy system is provided that includes a light source, a detector for capturing a raw image stack, the raw image stack having a plurality of pixel locations associated therewith and comprising a plurality of temporally spaced image frames of a sample, and a control system coupled to the light source and the detector. The control system is structured and configured to: receive the raw image stack, determine a number of temporal minimum intensity values for each pixel location from the raw image stack, and calculate an expected background value for each pixel location based on the number of temporal minimum intensity values for the pixel location.

In still another embodiment, an emitter localization method for a fluorescence microscopy system is provided. The method includes receiving a raw image stack generated by the fluorescence microscopy system, the raw image stack comprising a plurality of temporally spaced image frames of a sample, determining from the raw image stack a rough position of each of a plurality of emitters within the raw image stack by employing a linear deconvolution process, and determining a precise position of each of the plurality of emitters by employing the rough position of the emitter and gradient fitting.

In yet another embodiment, a fluorescence microscopy system is provided that includes a light source, a detector for capturing a raw image stack, the raw image stack comprising a plurality of temporally spaced image frames of a sample, and a control system coupled to the light source and the detector. The control system is structured and configured to: determine from the raw image stack a rough position of each of a plurality of emitters within the raw image stack by employing a linear deconvolution process, and determine a precise position of each of the plurality of emitters by employing the rough position of the emitter and gradient fitting.

DETAILED DESCRIPTION OF EXEMPLARY EMBODIMENTS

Figure 1:
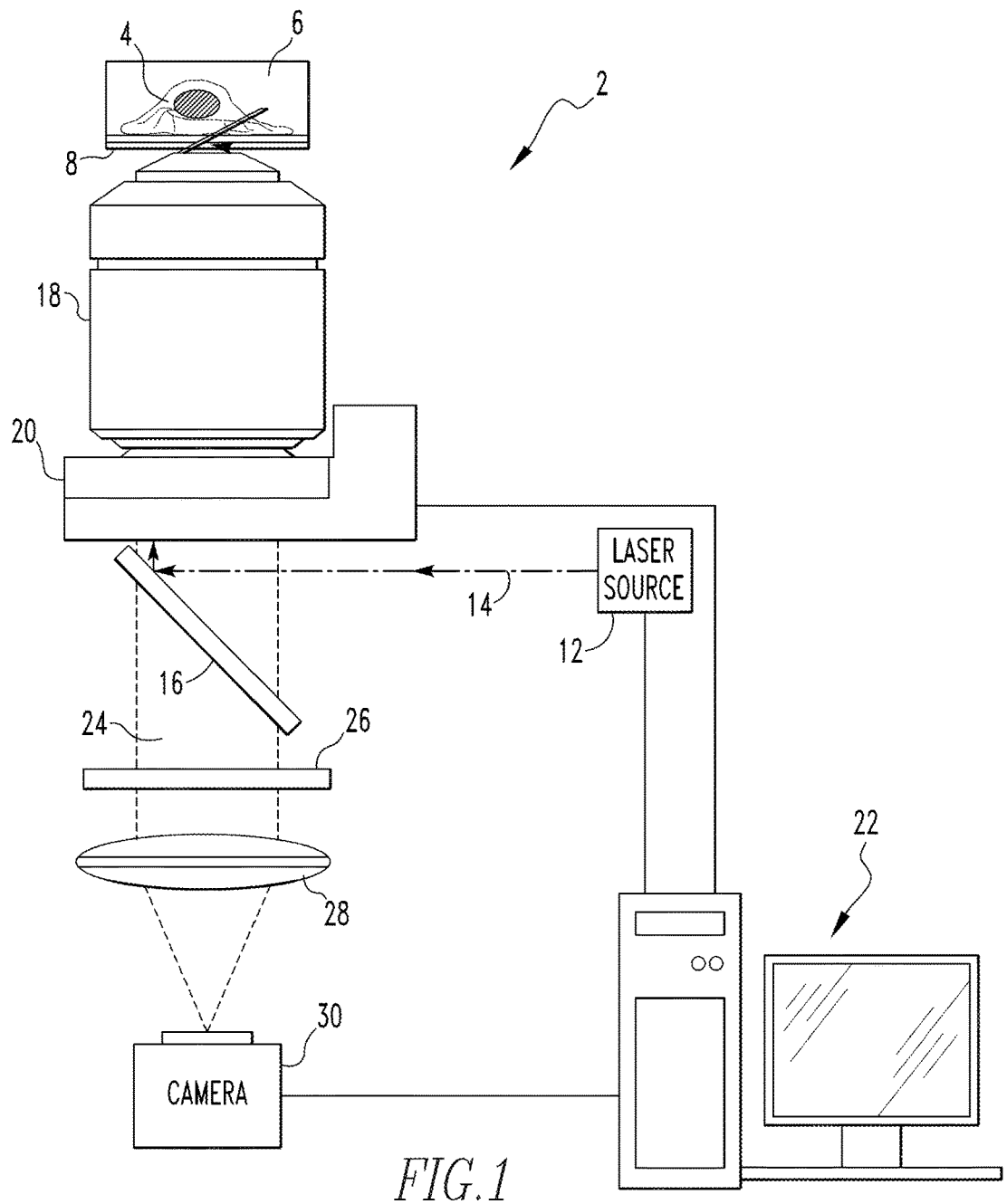
FIG. 1 is a schematic diagram of a fluorescence microscopy system according to an exemplary embodiment of the disclosed concept.

As used herein, the singular form of "a", "an", and "the" include plural references unless the context clearly dictates otherwise.

As used herein, the statement that two or more parts or components are "coupled" shall mean that the parts are joined or operate together either directly or indirectly, i.e., through one or more intermediate parts or components, so long as a link occurs.

As used herein, "directly coupled" means that two elements are directly in contact with each other.

As used herein, the term "number" shall mean one or an integer greater than one (i.e., a plurality).

As used herein, the terms "component" and "system" are intended to refer to a computer related entity, either hardware, a combination of hardware and software, software, or software in execution. For example, a component can be, but is not limited to being, a process running on a processor, a processor, an object, an executable, a thread of execution, a program, and/or a computer. One or more components can reside within a process and/or thread of execution, and a component can be localized on one computer and/or distributed between two or more computers.

As used herein, the term "linear deconvolution" shall mean a frequency domain based deconvolution method that applies an analytical filter for reducing or minimizing the impact of distortion, and shall include both regularized inverse deconvolution and Wiener deconvolution.

As used herein, the term "regularized inverse deconvolution" shall mean a frequency domain based deconvolution method that applies the truncated inverse filter for reducing or minimizing the impact of deconvolved noise at frequencies that have a poor signal-to-noise ratio.

As used herein, the term "Wiener deconvolution" shall mean a frequency domain based deconvolution method that applies the Wiener filter for reducing or minimizing the impact of deconvolved noise at frequencies that have a poor signal-to-noise ratio.

As used herein, the term "Wiener filter" shall mean a filter used to produce an estimate of a desired or target noisy process by linear space-invariant filtering of an observed noisy process, assuming known stationary signal and noise spectra, and additive noise.

As used herein, the term "gradient fitting" shall mean an emitter localization algorithm that calculates and employs a gradient angle distribution in a set of data, such as, without limitation, image data, and may include, without limitation, the method described in Ma, H. et al., "Fast and Precise 3D Fluorophore Localization based on Gradient Fitting", Sci. Rep. 5, 14335 (2015).

Directional phrases used herein, such as, for example and without limitation, top, bottom, left, right, upper, lower, front, back, and derivatives thereof, relate to the orientation of the elements shown in the drawings and are not limiting upon the claims unless expressly recited therein.

The disclosed concept will now be described, for purposes of explanation, in connection with numerous specific details in order to provide a thorough understanding of the subject invention. It will be evident, however, that the disclosed concept can be practiced without these specific details without departing from the spirit and scope of this innovation.

In one aspect, the disclosed concept provides a robust, accurate background correction algorithm for improving the fidelity of super-resolution image reconstruction. The background correction algorithm of the disclosed concept may, in one exemplary embodiment, be implemented as a plugin (e.g., an ImageJ plugin) to an existing localization microscopy computer program provided as part of a fluorescence microscopy system. As described in detail herein, the background correction algorithm of the disclosed concept is based on a pixelwise temporal minimum (MIN) of the image sequence, due to the strong resistance of such a MIN to the perturbation from structured background and non-background emitter signals. The corresponding background at each pixel location is then obtained by applying a derived transformation function described herein.

In another aspect, the disclosed concept provides a high-speed and high-density localization algorithm for use in high-throughput super-resolution microscopy. The localization algorithm of the disclosed concept is based on a two-step processes that employs algebraic methods with low computing complexity. The first step is to identify a number of overlapping emitters and roughly estimate their central positions by a linear deconvolution process (such as a modified Wiener deconvolution in one exemplary embodiment, and a regularized inverse deconvolution in another, alternative exemplary embodiment), and the second step is to further improve the localization precision via gradient fitting. The localization algorithm of the disclosed concept can thus be efficiently implemented in a graphics processing unit (GPU) device to realize a throughput of three orders of magnitude higher than conventional algorithms, while retaining comparable localization accuracy and emitter recall rate.

FIG. 1 is a schematic diagram of a fluorescence microscopy system 2 according to an exemplary embodiment of the disclosed concept. Fluorescent microscopy system 2 is structured and configured to obtain images (e.g., two dimensional images) from a sample 4 that, in the exemplary illustrated embodiment, is provided within a dish 6 covered by a coverslip 8.

Fluorescence microscopy system 2 includes a laser source 12 for generating illumination light 14. In one particular exemplary embodiment, the intensity of the illumination light 14 may be controlled by a number of neutral density filters and high-speed shutters provided as part of laser source 12, and the illumination light 14 may be expanded by a beam expander (e.g., a 10× beam expander) provided as part of laser source 12. Fluorescence microscopy system 2 further includes a dichroic mirror 16 which directs the illumination light 14 to an objective lens system 18 (e.g., an oil immersion objection including an achromatic focusing lens) supported by a nanoposition stage 20. Both laser source 12 and nanoposition stage 20 are operatively coupled to a control system 22 that controls the operation thereof. Objective lens system 18 is structured to direct illumination light 14 to sample 4 in order to illuminate sample 4 and cause it to emit light 24 of certain wavelengths different than illumination light 14. Nanoposition stage 20 is structured to selectively move objective lens system 18 in the lateral (x, y) and axial (z) directions under the control of control system 22. Fluorescence microscopy system 2 also includes an emission filter 26 which separates the emitted light 24 from the illumination light 14. A tube lens 28 is provided to direct emitted light 24 to a detector 30 which, in the illustrated exemplary embodiment, is a digital camera. Detector 30 is coupled to control system 22 to control the operation thereof and to receive data therefrom (i.e. data relating to the two dimensional images that are captured).

In addition, in the exemplary embodiment, control system 22 is structured and configured (e.g., without limitation, by way of a plugin) to implement a method according to the disclosed concept for providing robust background correction for super-resolution localization microscopy which is described in greater detail herein. Also in the exemplary embodiment, control system 22 is further structured and configured (e.g., without limitation, by way of another plugin) to implement a method according to the disclosed concept for providing emitter localization so as to enable implementation of high-speed and high-density localization for high-throughput super-resolution microscopy applications.

Figure 2:
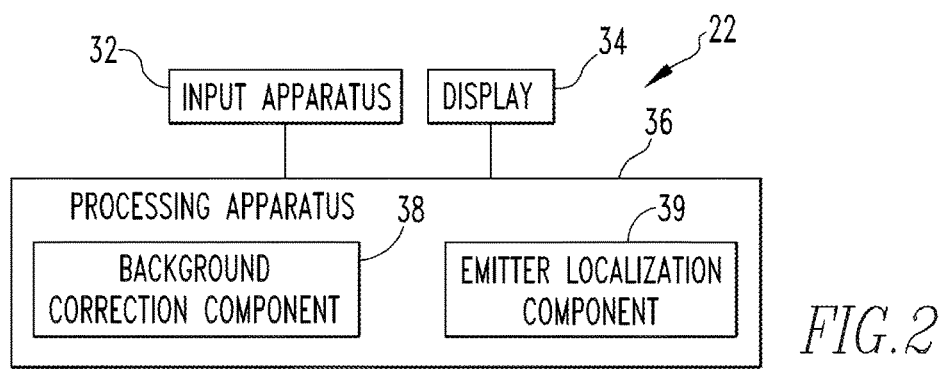
FIG. 2 is a schematic diagram of an exemplary control system according to an exemplary embodiment of the disclosed concept.

FIG. 2 is a schematic diagram of an exemplary control system 22 according to an exemplary embodiment of the disclosed concept. As seen in FIG. 2, control system 22 is a computing device structured and configured to receive digital image data (e.g., a raw image stack) representing a number of raw image frames generated by detector 30 over a certain time period and process that data as described herein. Control system 22 may be, for example and without limitation, a PC, a laptop computer, or any other suitable device structured and configured to perform the functionality described herein. Control system 22 includes an input apparatus 32 (such as a keyboard), a display 34 (such as an LCD), and a processing apparatus 36. A user is able to provide input into processing apparatus 36 using input apparatus 32, and processing apparatus 36 provides output signals to display 32 to enable display 32 to display information to the user (such as images generated from sample 4) as described in detail herein. Processing apparatus 36 comprises a processor and a memory. The processor may be, for example and without limitation, a microprocessor (μP), a microcontroller, or some other suitable processing device, that interfaces with the memory. The memory can be any one or more of a variety of types of internal and/or external storage media such as, without limitation, RAM, ROM, EPROM(s), EEPROM(s), FLASH, and the like that provide a storage register, i.e., a non-transitory machine readable medium, for data storage such as in the fashion of an internal storage area of a computer, and can be volatile memory or nonvolatile memory. The memory has stored therein a number of routines (comprising computer executable instructions) that are executable by the processor, including routines for implementing the disclosed concept as described herein. In particular, processing apparatus 36 includes: (i) a background correction component 38 configured for improving the fidelity of super-resolution image reconstruction based on received image data as described herein, and (ii) an emitter localization component 39 for enabling high-speed and high-density emitter localization for high-throughput super-resolution microscopy applications.

The method for providing robust background correction for super-resolution localization microscopy according to an aspect of the disclosed concept will now be described in detail. For illustrative purposes, the method will be described in connection with the exemplary fluorescence microscopy system 2 shown in FIG. 1 using the example sample 4, dish 6, and coverslip 8, although it will be appreciated that other implementations and configurations are possible within the scope of the disclosed concept.

The background fluorescence in localization-based super-resolution microscopy typically comes from multiple sources, such as autofluorescence, out-of-focus unbleached continuously emitting fluorophores, or scattered light from other focal planes. The individual emitters used for fluorophore localization and image reconstruction undergo multiple rapid blinking cycles, whereas the background fluorescence undergoes slower variation over a longer time. Therefore, a temporal filter is inherently superior to commonly used spatial filters to separate the fast-changing emitters from the slowly varying background. In one recent prior art implementation, described in Hoogendoorn, E. et al., "The Fidelity of Stochastic Single-molecule Super-resolution Reconstructions Critically Depends Upon Robust Background Estimation", Sci. Rep. 4, 3854 (2015), a temporal median filter was shown to outperform other spatial filtering and improve the quality of the reconstructed super-resolution image. However, the performance of the temporal median filter depends on sample and image characteristics. As a result, this prior art implementation suffers from significant over-estimation, which can suppress the emitters and reduce the recall rate, especially in moderate to high density or 3D localization scenarios.

Figure 3:
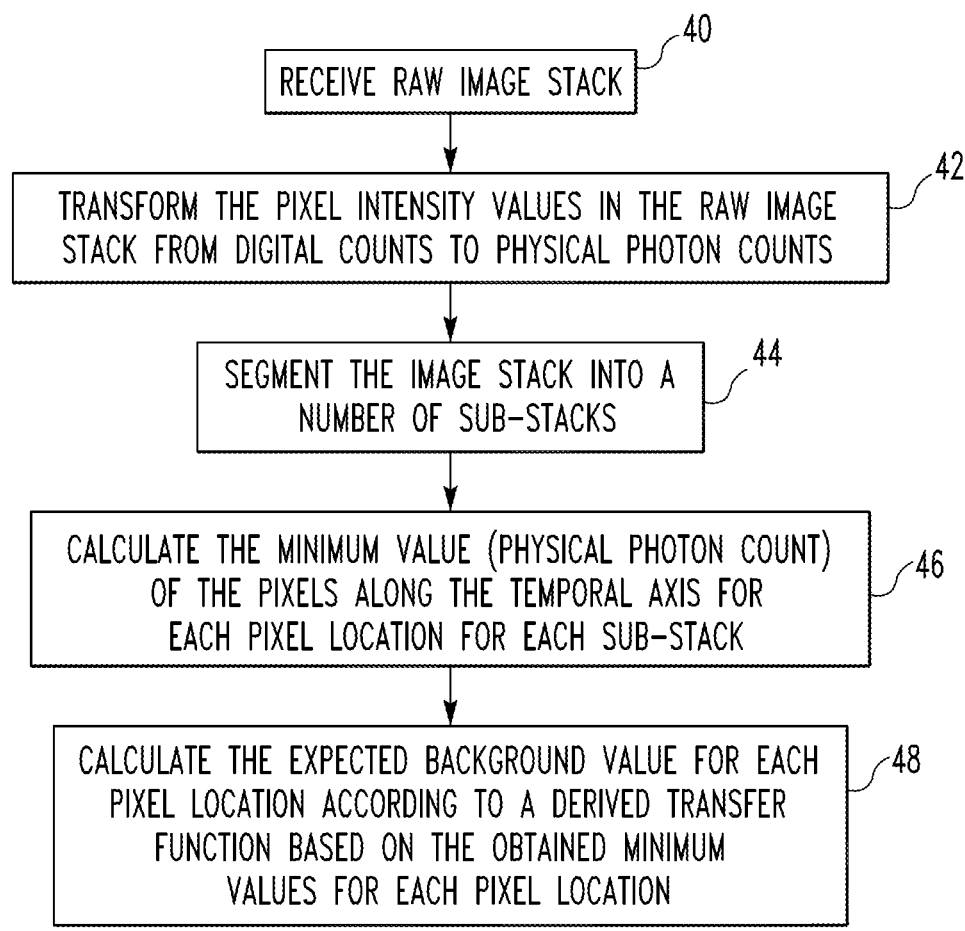
FIG. 3 is a flowchart showing a background correction algorithm of the disclosed concept according to the exemplary embodiment.

The disclosed concept overcomes these issues by providing a temporal minima-based background correction algorithm to improve the quality and fidelity of the reconstructed image in localization-based super-resolution microscopy. FIG. 3 is a flowchart showing the background correction algorithm of the disclosed concept (which may be implemented in background correction component 38) according to the exemplary embodiment.

Referring to FIG. 3, the method begins at step 40, wherein camera 30 captures a raw image stack (i.e., digital data representing the raw image stack) of/from sample 4 and provides the raw image stack to control system 22 (and specifically to background correction component 38 of processing apparatus 36). In the exemplary embodiment, the raw image stack is a collection of data representing a series (e.g., thousands) of fluorescence microscopy images (each an image frame) taken of sample 4 over a certain period of time (e.g., two minutes). The raw image stack is thus a series of temporally spaced image frames of sample 4. For example, in an implementation that employs 1 million labeled fluorescent emitters, in order to achieve sparse distribution of the emitters, only 0.01% of these molecules can be allowed to be turned "on" at a particular time and be localized. Thus, to properly reconstruct an image using localization microcopy, in one embodiment, 10,000 individual temporally spaced image frames will need to be accumulated to form the raw image stack in order to image all labeled emitters.

In addition, it will be understood that the raw image stack will have associated with it a plurality of pixel locations, arranged in an array, that make up a frame structure for the raw image stack. As a result, each individual image frame in the raw image stack, when captured, will have a particular pixel intensity value for each of the pixel locations. In particular, in the exemplary embodiment, camera 30, when capturing image frames and thus when capturing the raw image stack, converts photons into electrons to detect optical signals. In doing so, camera 30 detects "digital counts" at each pixel location as the pixel intensity value. The digital counts, however, are not exactly equivalent to a count of physical photons. The physical photon count value can, however, be calculated from the digital count value based on the following equation: $V_{photon}=(V_{count}-V_{baseline})/V_{gain}$. Thus, according to the method of FIG. 3, after and in response to receiving the raw image stack, background correction component 38, at step 42, transforms every pixel intensity value in each of the image frames of the raw image stack from a digital count value to a physical photon count value (i.e., a number of physical photons) as just described.

Next, at step 44, background correction component 38 segments or divides the raw image stack into a number of sub-stacks each comprising a number (e.g., 100) of the temporally spaced image frames. Then, at step 46, background correction component 38 calculates, for each of the sub-stacks, the minimum physical photon count value along the temporal axis for each pixel location of the raw image stack. Thus, as will be appreciated, at the end of step 46, each sub-stack will have a calculated minimum physical photon count value for each of the pixel locations of the raw image stack. In other words, at the end of step 46, each pixel location of the raw image stack will have a plurality of calculated minimum physical photon count values, one for each sub-stack.

Then, at step 48, background correction component 38 calculates an expected background value (in the form of a physical photon count in the exemplary embodiment) for each pixel location of the raw image stack according to a derived transfer function (exemplary embodiments described below) based on the minimum values obtained for each pixel location in step 46 (i.e., the minimum value for each sub-stack for each pixel location). The calculated expected background values are then subtracted from the data of the raw image stack to create adjusted raw image stack data that may then be used for further localization microscopy processing as described herein. In particular, the adjusted raw image stack data is created according to the exemplary embodiment by, for each individual image frame of the raw image stack, decreasing the data value at each pixel location by the calculated expected background value for that pixel location.

The derived transfer function of two exemplary embodiments will now be described in detail. It will be appreciated, however, that the disclosed transfer functions are meant to be exemplary only, and that other temporal minima based transfer functions may also be employed within the scope of the disclosed concept.

According to the first exemplary embodiment, the acquired signal can be modeled as a Poisson distribution, as the read noise, dark noise and the corrected fixed pattern noise can be neglected for most advanced cameras (e.g. sCMOS cameras). The probability distribution function (PDF), cumulative distribution function (CDF), and minimum value distribution function (MDF) of a Poisson distribution can be described by Equations 1 below:

$$\begin{cases} NDF(k, \lambda, f) = \prod_{1}^{f}(1 - CDF(k-1, \lambda)) - \prod_{1}^{f}(1 - CDF(k, \lambda)) \\ CDF(k, \lambda) = e^{-\lambda} \sum_{0}^{k} \frac{\lambda^k}{k!} \\ PDF(k, \lambda) = e^{-\lambda} \frac{\lambda^k}{k!} \end{cases},$$

where k is the photon number, $\lambda$ is the expected average photon number for each pixel and f is the length of signal used to estimate the minimum value.

Figure 4A:
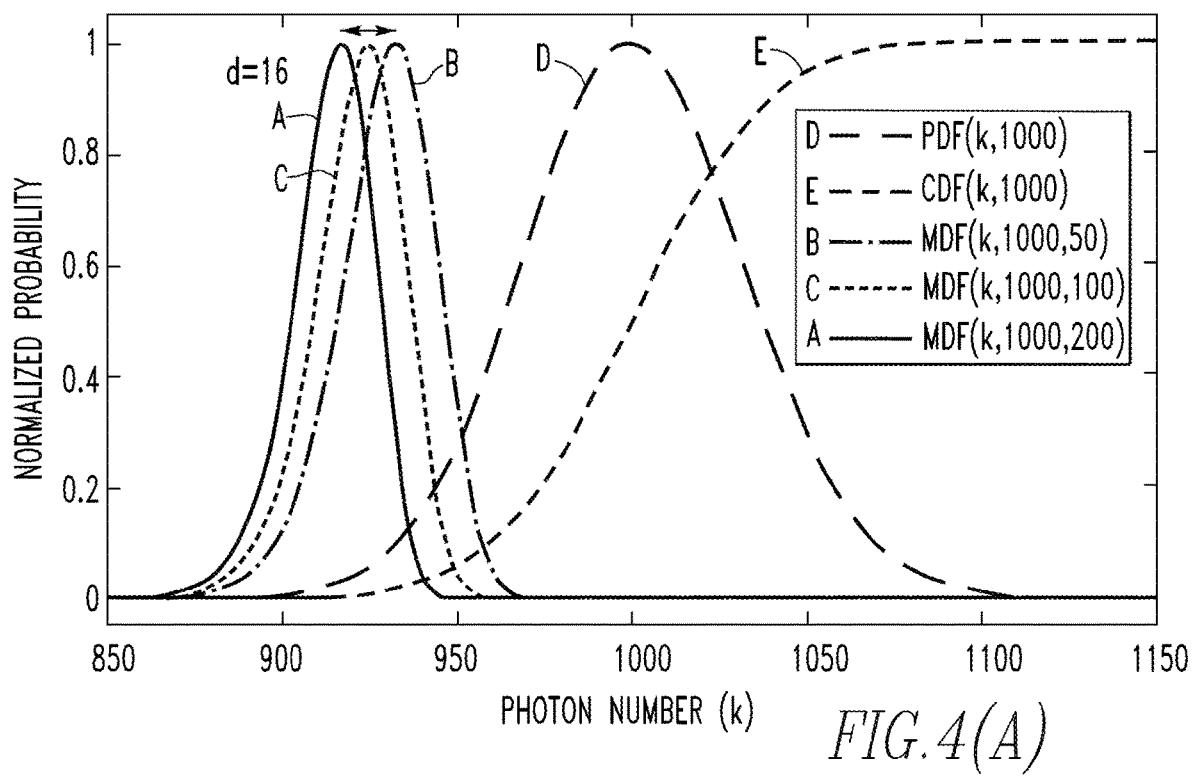
FIG. 4(A) shows a PDF, CDF and MDF of a Poisson distribution with an expected photon number of 1000 according to an aspect to the disclosed concept.

In addition, it is assumed that a one-dimensional signal (e.g., number of photons at each pixel location) is collected along the temporal axis over a certain number of image frames. FIG. 4(A) shows the PDF, CDF and MDF of a Poisson distribution with the expected photon number of 1000 ($\lambda$=1000). In the case of localization microscopy, the collected signal consists of background plus emitter signals. In an ideal case with no emitter signal, the statistical distribution of the minimum value (MDF(k, 1000, 200)) for the background signal is shown as curve A in FIG. 4(A), assuming that background remains constant along the temporal axis over a certain number of frames (e.g., 200 frames). When the collected signal gets perturbed by emitters, the affected signal (background+emitter) is always larger than the true background signal. For example, if only 50 out of the 200 frames are the unaffected true background signals, its MDF is shown as curve B in FIG. 4(A). This result shows that the estimated average temporal minimum value for a signal sequence with 75% of the signals perturbed by emitters differs only by 16 photons from the true background value. In comparison, the temporal median or mean value for the same scenario will differ by ~1000 and 750 photons (assuming emitter photon=1000), respectively, from the true background value. Therefore, the temporal minimum is inherently more resistant to signal perturbation, which can serve as a robust basis to estimate background than other common temporal filters.

Figure 4B:
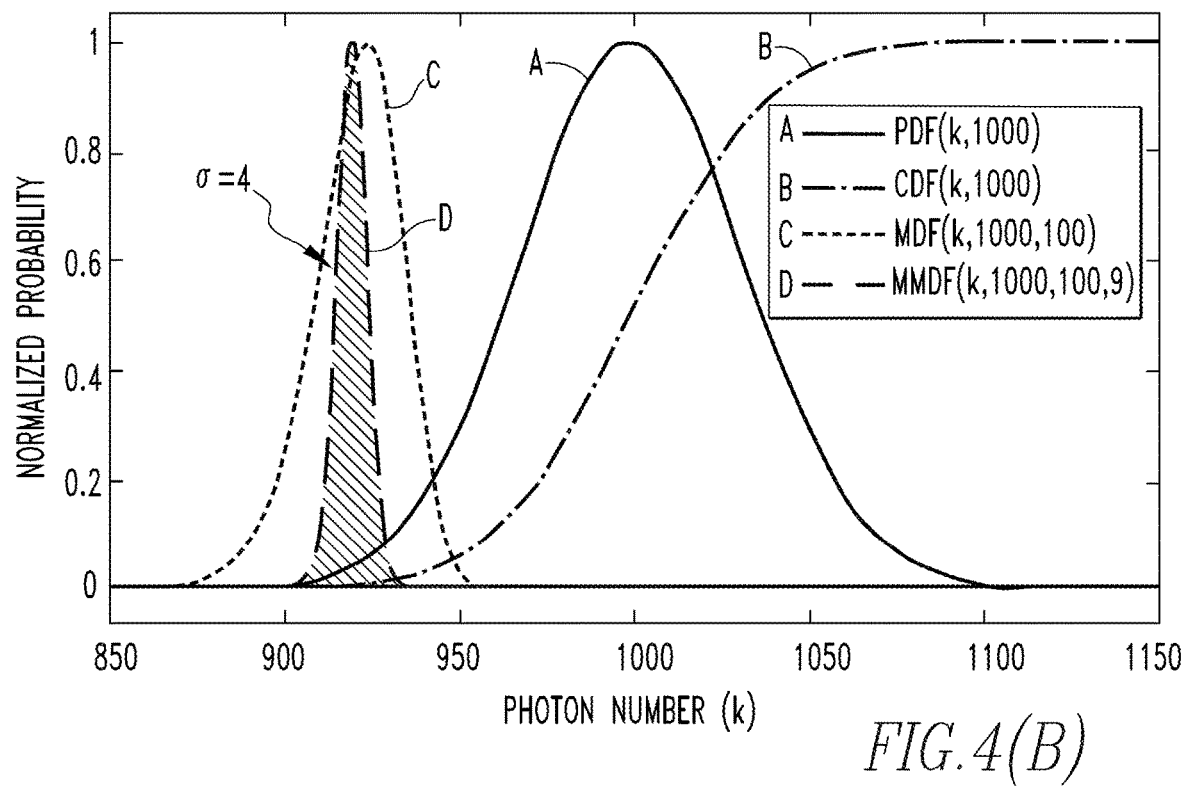
FIG. 4(B) illustrates how the precision of estimation can be improved if a spatial mean filter is applied.

The precision of this estimation can be further improved (reduced standard deviation), if a spatial mean filter (e.g., 3×3 mean filter) is applied, as shown in FIG. 4(B). The mean of the temporal minimum value distribution function (MMDF) can be described by Equation 2 below:

$$MMDF(nk, \lambda, f, n) = MDF_1(k, \lambda, f) \otimes MDF_2(k, \lambda, f) \\ K \otimes MDF_n(k, \lambda, f),$$

where n is the number of pixels being averaged.

Figure 5:
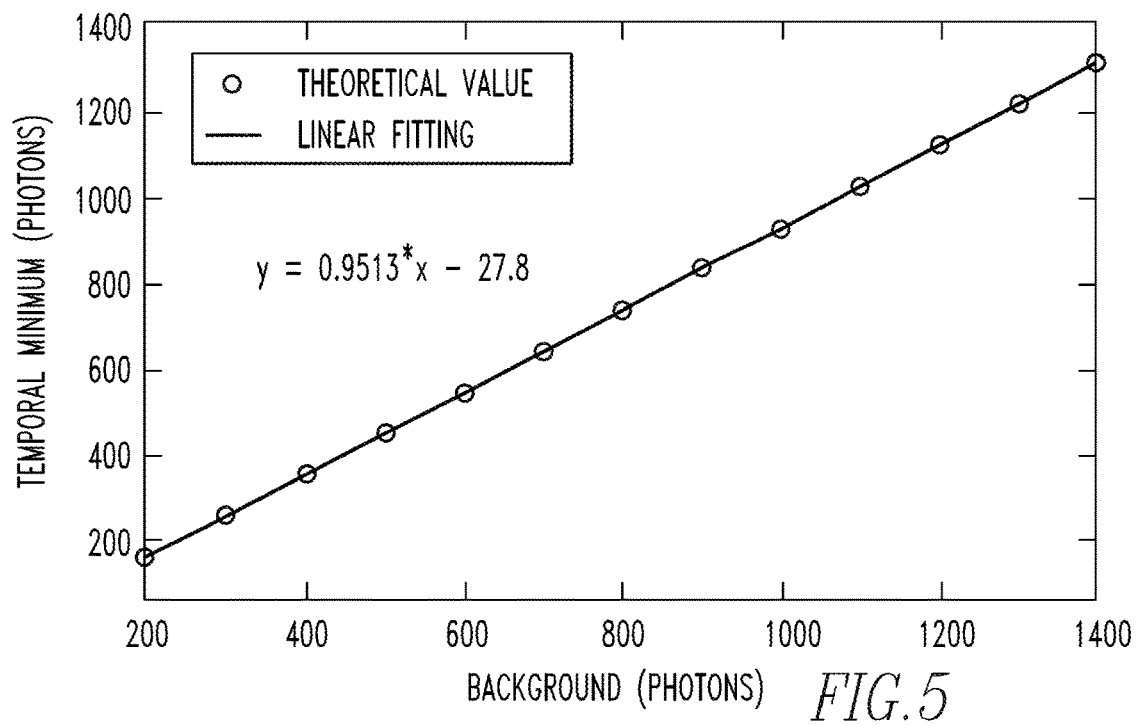
FIG. 5 shows the average temporal minimum value for a wide range of background levels (200-1400 photons) commonly seen in localization-based super-resolution imaging datasets.

Equation 2 is rather complicated and difficult to implement for real experimental data. Therefore, a simple relationship between the average temporal minima ($V_{MN}$) and the expected background ($V_{BG}$) was developed according to an aspect of the disclosed concept. Based on Equation 2, if the background fluorescence remains stable along the temporal axis in each subset of 100 frames, FIG. 5 shows the average temporal minimum value for a wide range of background levels (200-1400 photons) commonly seen in localization-based super-resolution imaging datasets, which exhibits a perfectly linear dependence with the fitted Equation 3 ($R^2$>0.9999, residual error of <4 photons) below:

$$V_{MIN} = 0.9513 \times V_{BG} - 27.8,$$

where $V_{BG}$ is the expected background and $V_{MIN}$ is the MMDF in Equation 2.

Figure 6A:
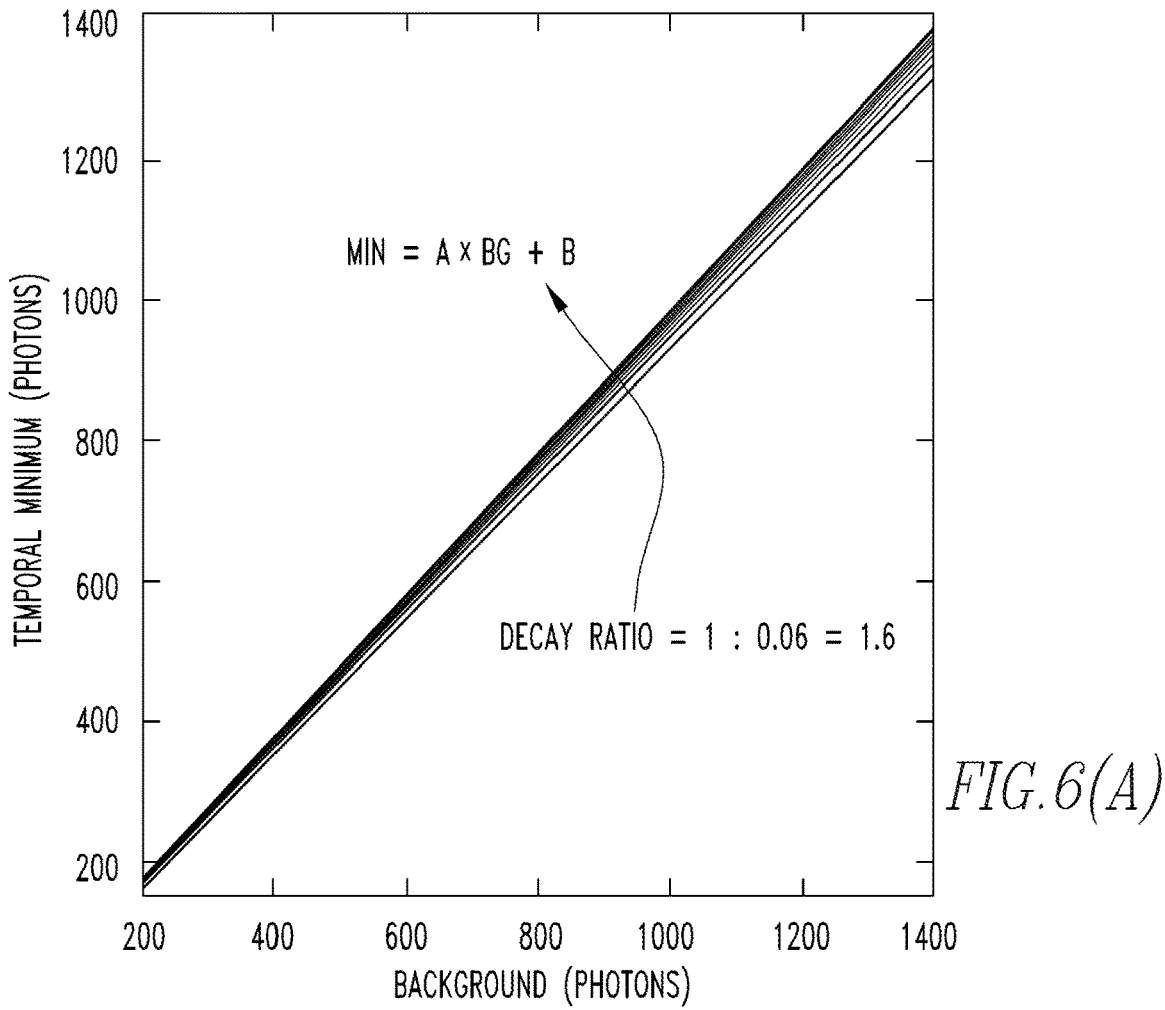
FIGS. 6(A)-6(C) illustrate how the variation of A and B in Equation 4 herein along different variation ratios can be well approximated by a simple two-term exponential function.
Figure 6B:
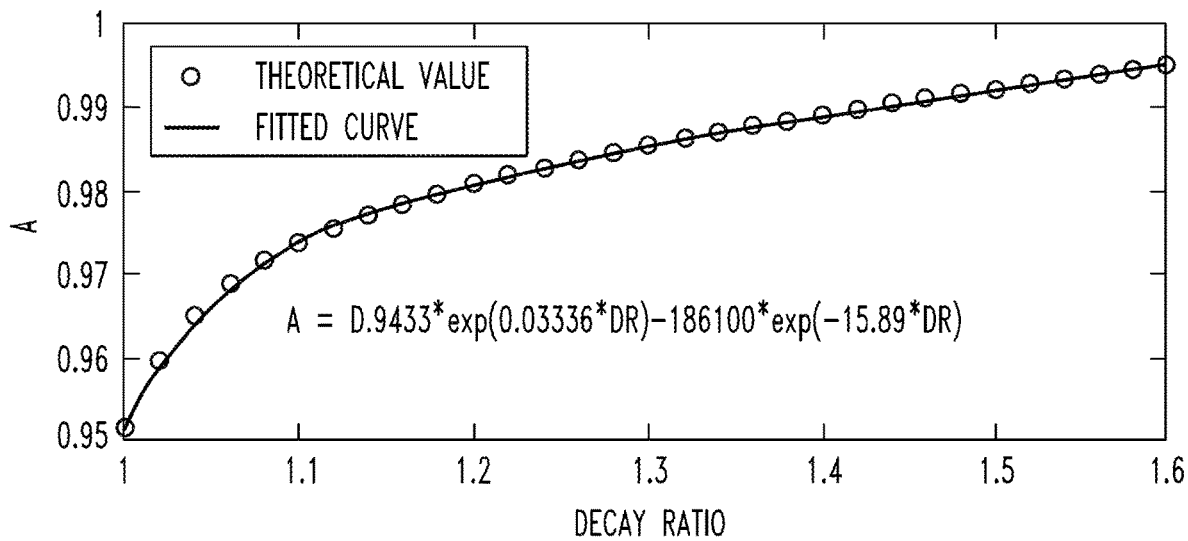
Figure 6C:
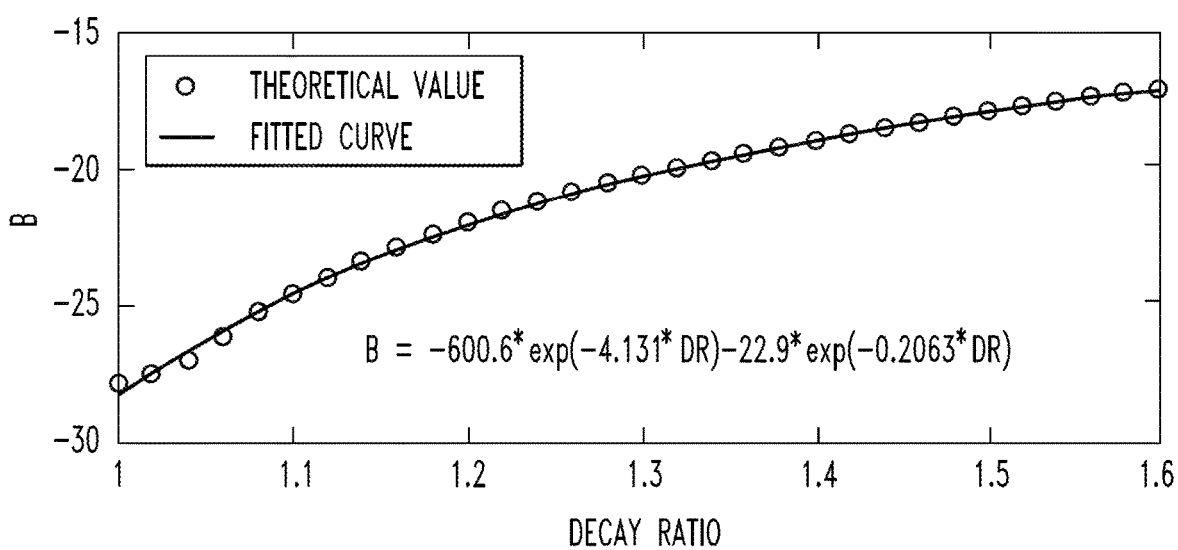

However, in many cases, the background fluorescence undergoes a slow variation rather than remaining constant, even for a small subset of image frames (e.g., 100-200 frames). To improve robustness, Equation 3 is modified by incorporating the impact of different background variation rates, which is shown in the following Equation 4, which is the derived transfer function of this exemplary embodiment:

$$\begin{cases} V_{BG} = V_{DF} \times (V_{MIN} - B)/A \\ A = 0.9433 \times \exp(0.03336 \times V_{DR}) - 186100 \times \exp(-15.89 \times V_{DR}) \\ B = -600.6 \times \exp(-4.131 \times V_{DR}) - 22.9 \times \exp(-0.2063 \times V_{DR}) \end{cases},$$

where $V_{BG}$ is the expected background value at a particular pixel location of the raw image stack, where $V_{MIN}$ is the average of the calculated sub-stack minimum values at the particular pixel location of the raw image stack, where $V_{DF}$ is the variation factor for the $f_{th}$ frame, defined as $V_f$/min ($V_1$:$V_{100}$); and where $V_{DR}$ is the variation ratio, defined as the average value of the $V_{DF}$. The variation of A and B along different variation ratios can be well approximated by a simple two-term exponential function, as shown in FIGS. 6(A)-6(C). When no variation is present, Equation 4 can be reduced to Equation 3.

According to the second exemplary embodiment, the acquired signal can also be modeled as a Poisson distribution, as the read noise, dark noise (generally <2 electrons per second) and the corrected fixed pattern noise can be neglected for the commonly used sCMOS cameras in high-throughput nanoscopy. The composite signal recorded on the camera consists of the fast-changing emitters and the slowly varying background. In an extreme case with an ultra-sparse emitter signal, the composite signal is nearly equivalent to the background signal, which can be well estimated by a temporal median value. But in the case of dense emitters when the probability of emitter occurrence within an imaging sequence can be more than 50%, the temporal median value is significantly skewed towards the composite signals, resulting in serious over-estimation of the background signal. However, the extreme value of the temporal minimum remains relatively stable regardless of the probability of emitter occurrence, suggesting its inherent robustness. To derive the statistics of temporal minimum, N random variables are first considered to model the photon number, $k_1$, $k_2$, ..., $k_N$, that is independently and identically Poisson distributed with the cumulative distribution function given by Equation 5 below:

$$CDF(k, \lambda) = Prob(K \leq k) = e^{-\lambda} \sum_0^k \frac{\lambda^k}{k!},$$

where $\lambda$ is the expected average photon number for each pixel. A new random variable $K_{min}=\min(k_1, k_2, \ldots, k_N)$ is then defined that takes the minimum value among the N Poisson random variables. The cumulative distribution function of this minimum value is given by Equation 6 below:

$$CDF(k,\lambda)=Prob(K_{min} \leq k)=1-Prob(K_{min}>k)=1-\Pi_{n=1}^N Prob(K_n>k)=1-(Prob(K>k))^N$$

Then the probability mass function (the probability of being the minimum value) is now given by Equation 7 below:

$$pmf_{min}(k, \lambda, N) =$$
$$Prob(K_{min} = k) = CDF_{min}(k, \lambda.N) - CDF_{min}(k-1, \lambda, N) =$$
$$(Prob(K > k - 1))^N - (Prob(K > k))^N =$$
$$(1 - CDF_{min}(k-1, \lambda))^N - (1 - CDF_{min}(k, \lambda))^N.$$

For many experimental data, the background also undergoes a slow decay during N frames. To account for such variation, a decay ratio R is introduced, and Equation 7 can be modified to Equation 8 below:

$$pmf_{min}(k, \lambda, N, R) = \prod_{n=0}^{n=N-1} \left(1 - CDF_{min}\left(k-1, \lambda\left(1+(R-1)\frac{n}{N-1}\right)\right)\right) -$$

-continued $$\prod_{n=0}^{n=N-1}\left(1 - CDF_{min}\left(k, \lambda\left(1+(R-1)\frac{n}{N-1}\right)\right)\right)$$

If a spatial mean filter (e.g., 3×3 mean filter) is applied, the mean of the probability of the temporal minimum value can be further narrowed (reduced standard deviation), which can be described by Equation 9 below:

$$pmf_{min}(k,\lambda,N,R)=pmf_{min}(k,\lambda,N,R,i=1)\otimes pmf_{min}(k,\lambda,N,i=2)\ldots \otimes pmf_{min}(k,\lambda,N,R,i=m)$$

where m is the number of pixels being averaged.

However, the derived statistical formula for the temporal minimum value described in Equation 9 is mathematically complex and may not be practical for high-speed processing. To directly estimate the background signal from the temporal minimum, Equation 8 is fitted with a simple cubic polynomial function. Thus, a simple algebraic relationship between pixelwise temporal minimum and estimated background by this calibration curve can be established as Equation 10 below:

$$V_{BG1}=A_1 V_{MIN}^3+B_1 V_{MIN}^2+C_1 V_{MIN}+D_1,$$

where $V_{BG1}$ is the estimated background for each pixel, $V_{MIN}$ is the pixelwise temporal minimum of the 100-frame sub-stack, and the fitted coefficients of Eq. 10 are $A_1=8.2469\times10^{-8}$; $B_1=-1.6468\times10^{-4}$; $C_1=1.1546$; $D_1=13.3655$.

The above mathematical formula is derived based on a temporally uniform background. But in many experiments, the background can undergo slow variation over time. To accommodate for such temporally slowly-changing background, the above calibration curve is modified to Equation 11 below:

$$\begin{cases} V_{BG2} = V_R \times (A_2 V_{MIN}^3 + B_2 V_{MIN}^2 + C_2 V_{MIN} + D_2) \\ V_R = V_f/V_{MIN} \end{cases},$$

where the fitted coefficient $A_2$, $B_2$, $C_2$ and $D_2$ are now dependent on a variation ratio R, defined as the average value of a variation factor $V_R$. This variation factor $V_R$ is calculated for each frame (fth frame), defined as the average intensity of the non-blinking area ($V_f$) divided by the temporal minimum value ($V_{MIN}$) over the 100-frame sub-stack. To determine the non-blinking area $V_f$, based on the slowly-varying non-blinking area and fast-changing emitters, the standard deviation of non-blinking area should be smaller than that of emitters. For Poisson-distributed signals, the mean is equal to the variance. Thus, those pixels are defined with standard deviation (over the 100-frame sub-stack) smaller than two times the square root of $V_{BG1}$ (approximated as the mean) as approximation for the non-blinking area. Thus, the coefficients of Equation 9 are modified as shown in Equation 12 below (as shown in FIGS. 7(A)-7(E)):

$$\begin{cases} A_2 = -0.297314062 \times 10^{-6} R^3 + 1.28935323 \times 10^{-6} R^2 - 1.89625851 \times 10^{-6} R + 0.986743487 \times 10^{-6} \\ B_2 = 0.599978065 \times 10^{-3} R^3 - 2.58484372 \times 10^{-3} R^2 + 3.7791658 \times 10^{-3} R - 1.95917478 \times 10^{-3} \\ C_2 = -1.18390145 R^3 + 4.86119798 R^2 - 6.715304335 R + 4.19208175 \\ D_2 = 12.6630675 R^3 - 43.1329389 R^2 + 41.5141569 R + 2.33712427 \end{cases}$$

Finally, the background can be estimated based on Equations 10 and 11. This estimated background has shown robust performance for a wide range of image characteristics, such as various emitter density, emitter intensity, emitter size, and structured background.

Note that while the fitted coefficients in Equation 8 are determined based on the theoretical equation, the variation ratio R and variation factor VR in Equations 10 and 11 need to be estimated for each sub-stack. An exemplary software implementation may already build in such background estimation from the raw image dataset without the need for adjustment by the user. However, if a user uses a camera where the excess noise caused by electron multiplication cannot be ignored, the background correction model needs to be adjusted to account for excess noise.

The method for providing high-density emitter localization according to a further aspect of the disclosed concept will now be described in detail. For illustrative purposes, the method will be described in connection with the exemplary fluorescence microscopy system 2 shown in FIG. 1 using the example sample 4, dish 6, and coverslip 8, although it will be appreciated that other implementations and configurations are possible within the scope of the disclosed concept.

As discussed above, the emitter localization technique of this aspect of the disclosed concept is based on a two-step process, wherein the first step identifies a number of overlapping emitters and roughly estimates their central positions by a linear deconvolution process (such as a modified Wiener deconvolution as described below in connection with a first exemplary embodiment, and a regularized inverse deconvolution also described below in connection with a second exemplary embodiment), and the second step improves the localization precision via gradient fitting. More specifically, in connection with the first exemplary embodiment, since conventional Wiener deconvolution often introduces significant artifacts that limit its performance, the disclosed concept employs three important modifications to conventional Wiener deconvolution to improve its performance before applying it to super-resolution localization microscopy. As described in detail below in connection with the first exemplary embodiment, those modifications include: (i) suppression of image artifacts via background correction, (ii) resolution improvement by double iteration, and (iii) artifact removal by intensity weighting. Furthermore, as also described in detail below, the disclosed concept provides improved localization precision by employing modified gradient fitting.

Figure 7A:
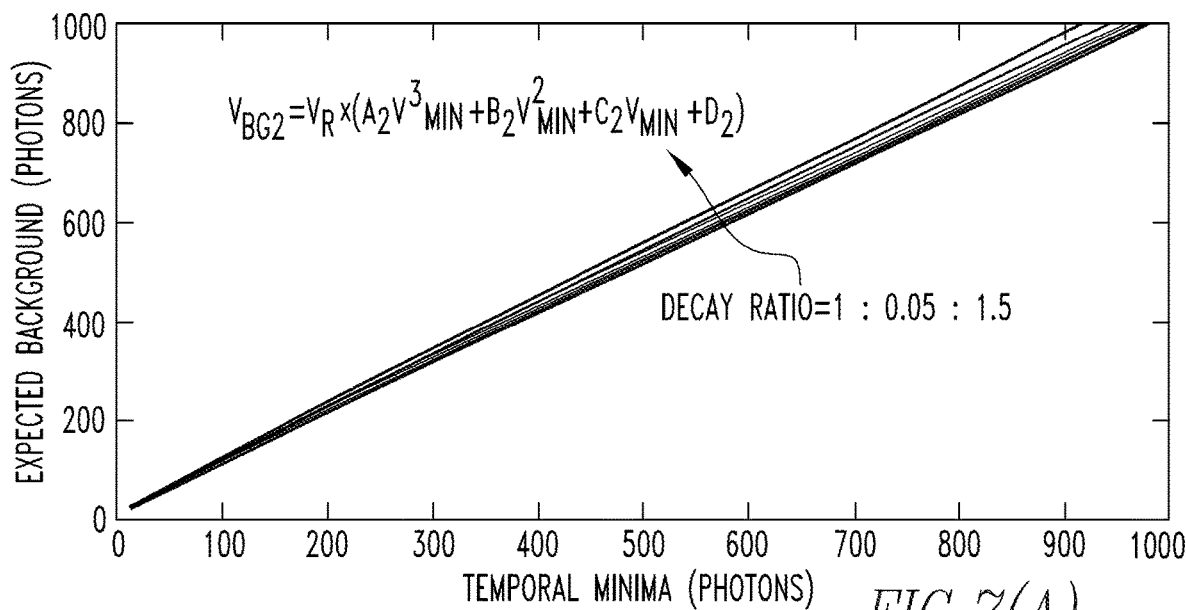
FIGS. 7(A)-7(E) illustrate how the coefficients of Equation 9 herein are modified as shown in Equation 12 herein.
Figure 7B:
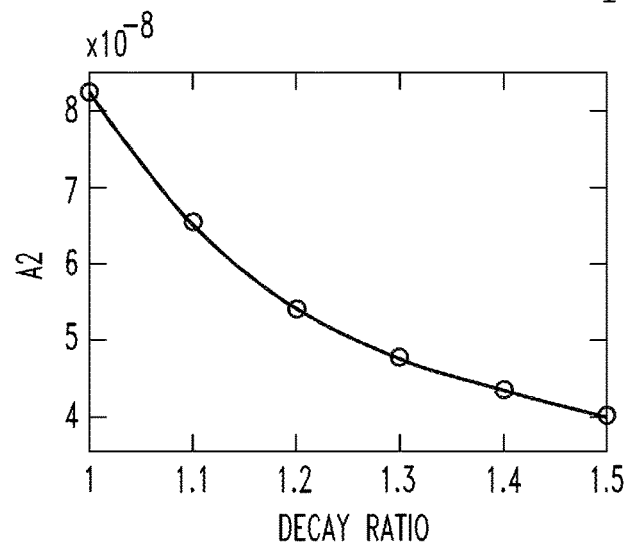
Figure 7C:
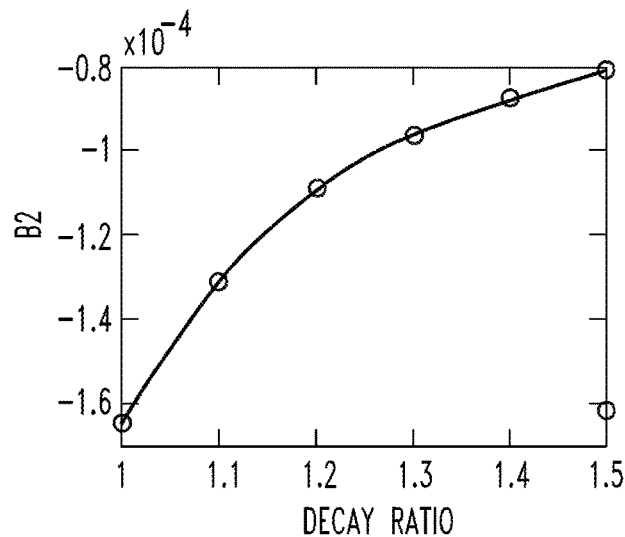
Figure 7D:
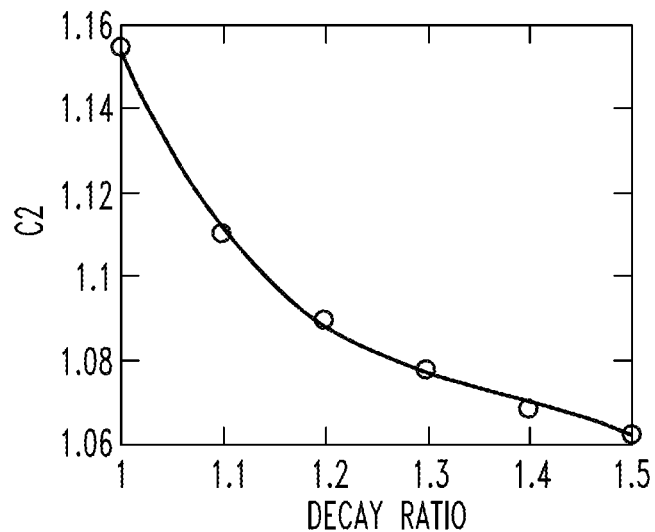
Figure 7E:
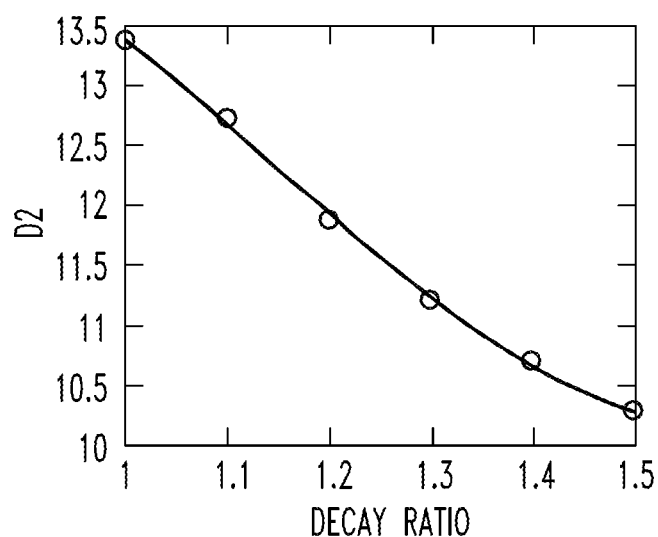
Figure 8A:
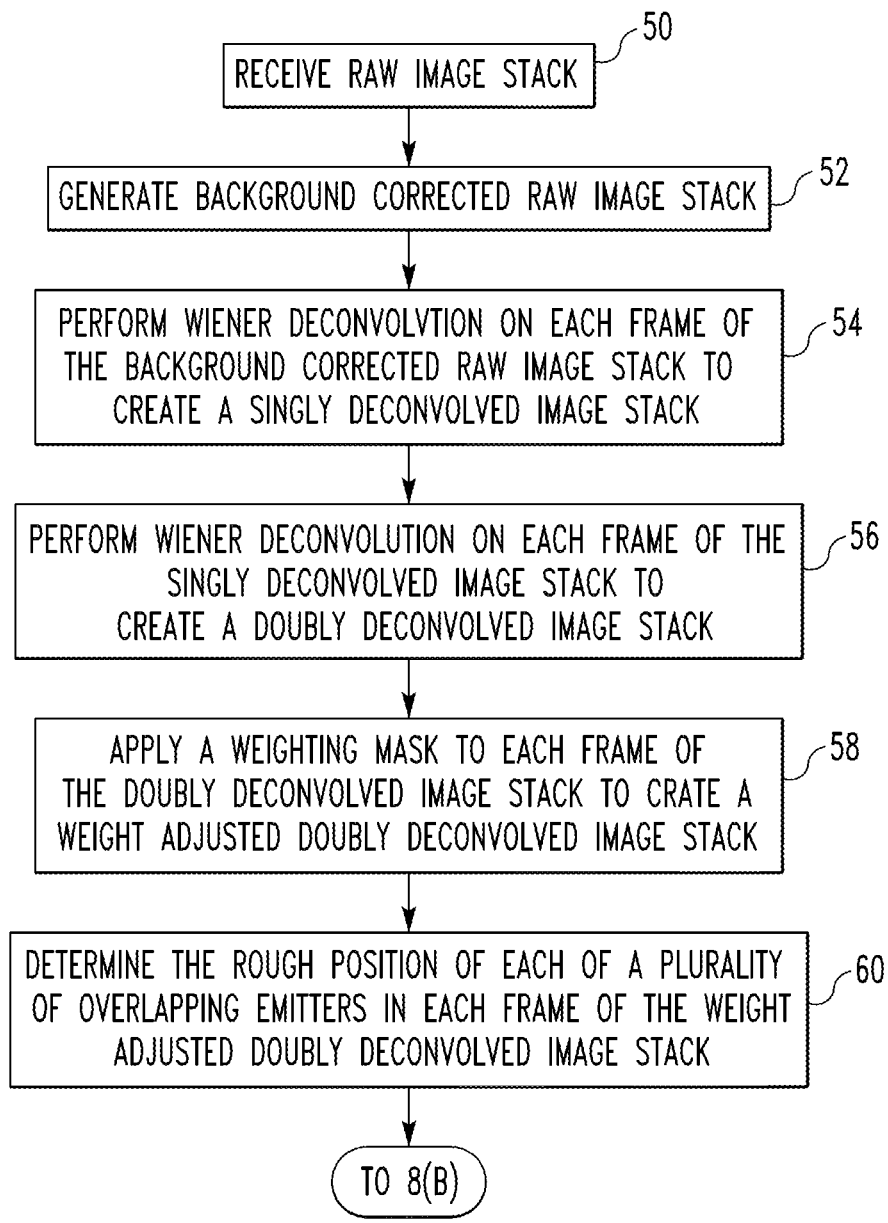
FIGS. 8(aA) and 8(B) are a flowchart showing an emitter localization algorithm of the disclosed concept according to a first exemplary embodiment that employs a modified Wiener deconvolution.
Figure 8B:
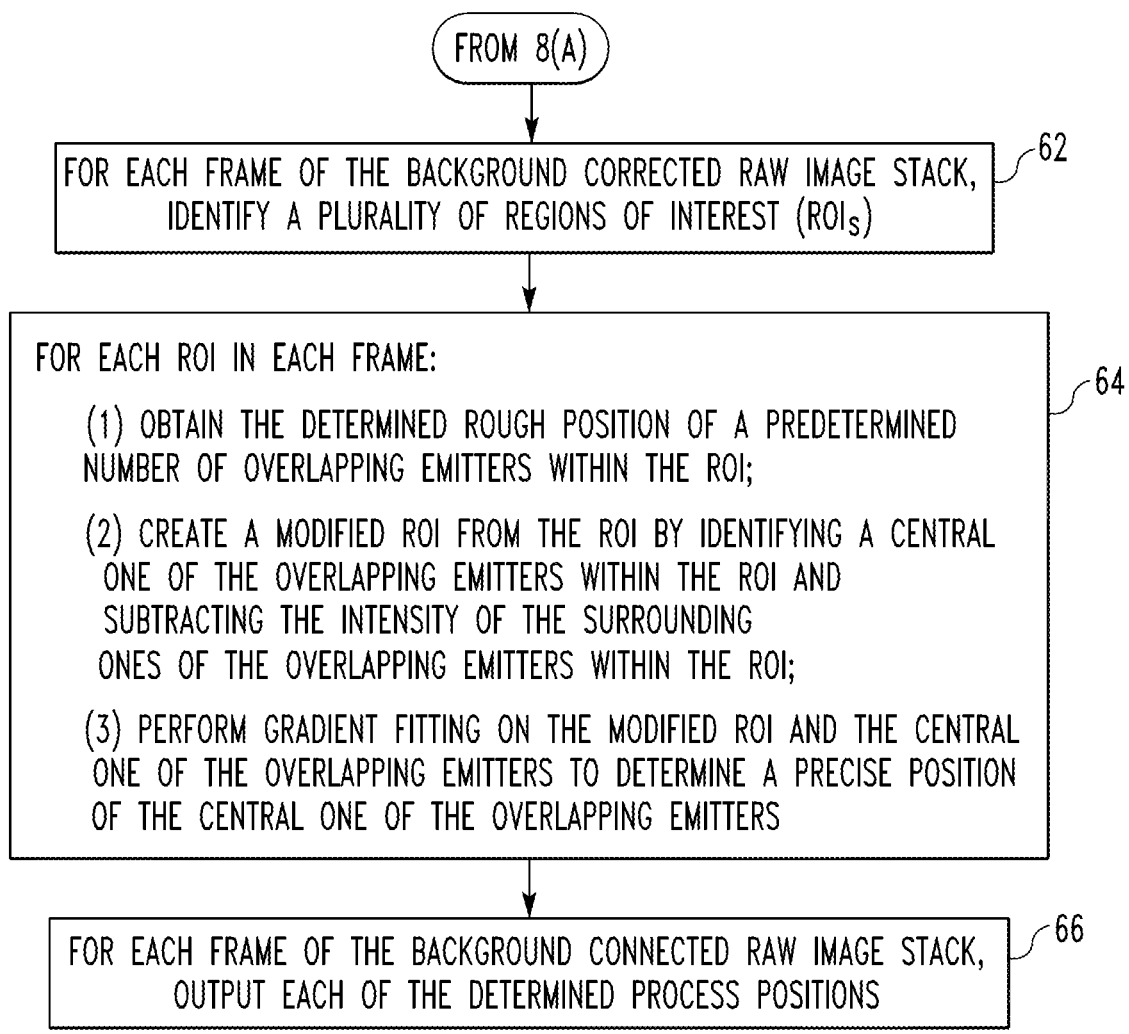

FIGS. 8(A) and 8(B) are a flowchart showing the emitter localization algorithm of the disclosed concept (which may be implemented in emitter localization component 39) according to the first exemplary embodiment that employs a modified Wiener deconvolution. More specifically, FIG. 8(A) shows a first portion of the emitter localization algorithm described above as the first step wherein the rough positions of overlapping emitters are estimated by a modified Wiener deconvolution, and FIG. 7(B) shows a second portion of the emitter localization algorithm described above as the second step wherein more precise positions of most of the overlapping emitters are determined via modified gradient fitting.

Figure 9A:
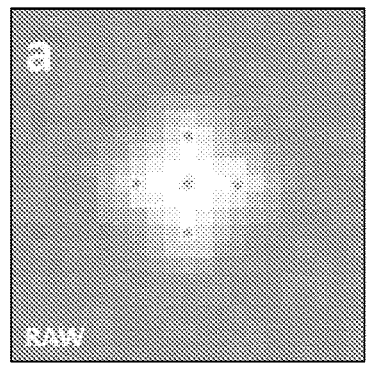
FIGS. 9(A)-9(G) show exemplary frames from the method of FIGS. 8(A) and 8(B)
Figure 9B:
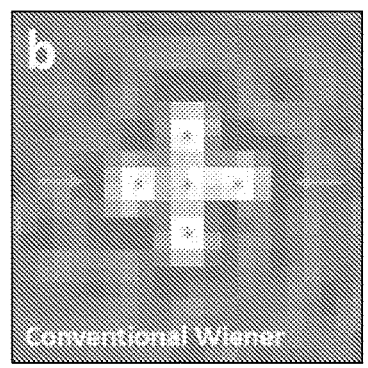
Figure 9C:
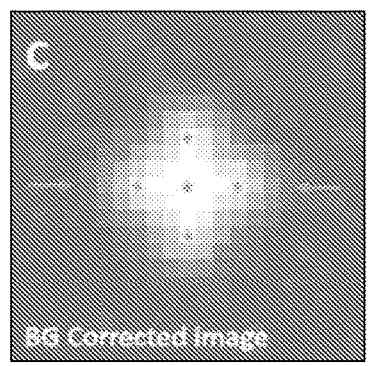
Figure 9D:
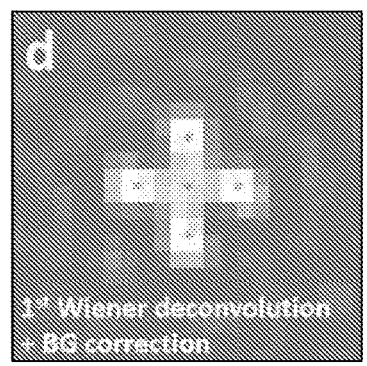
Figure 9F:
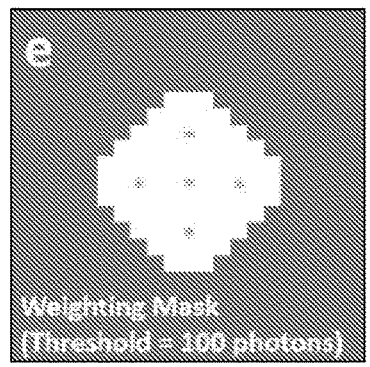
Figure 9E:
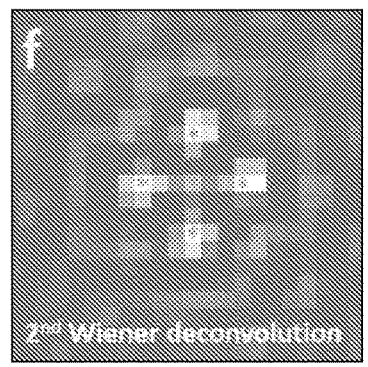

Referring to FIG. 8(A), the method begins at step 50, wherein camera 30 captures a raw image stack as described herein of/from sample 4 and provides the raw image stack to control system 22 (and specifically to emitter localization component 39 of processing apparatus 36). FIG. 9(A) shows an exemplary frame from the raw image stack showing five emitters. Conventional Wiener deconvolution algorithms suffer from severe artifacts in large part due to the noisy background, making it difficult to identify and localize the true emitters. FIG. 9(B) shows the exemplary frame from the raw image stack after conventional Wiener deconvolution has been performed thereon. As seen, the illustrated frame is relatively noisy. Thus, according to the disclosed concept, after step 50, the method, before performing any Wiener deconvolution, proceeds first to step 52. At step 52, emitter localization component 39 generates a background corrected raw image stack from the received raw image stack. In other words, at step 52, emitter localization component 39 performs background correction on the received raw image stack to account for and subtract estimated and/or expected background fluorescence values from the received raw image stack. In the exemplary embodiment, this is done using the method of FIG. 3 described herein (using background correction component 38), although it will be appreciated that other methods may also be used. FIG. 9(C) shows an exemplary frame from the background corrected raw image stack showing the five emitters. Then, at step 54, emitter localization component 39 performs Wiener deconvolution on each frame of the background corrected raw image stack to thereby create a singly deconvolved image stack. FIG. 9(D) shows an exemplary frame from the singly deconvolved image stack showing the five emitters which, as seen, has less artifacts than the frame shown in FIG. 9(B). Next, at step 56, emitter localization component 39 performs another (second) Wiener deconvolution on each frame of the singly deconvolved image stack to create a doubly deconvolved image stack. FIG. 9(E) shows an exemplary frame from the doubly deconvolved image stack showing the five emitters which, as seen, has improved resolution.

In the exemplary embodiment, the double-iteration Wiener deconvolution as just described is performed as follows. First, the first Wiener deconvolution is performed on the background-corrected image based on Equation 13 below:

$$I_{wd1} = IFFT\left(\frac{conj(FFT(I_{PSF})) \cdot FFT(I_{bgc})}{|FFT(I_{PSF})^2| + 1/(\sqrt{FFT(I_{bgc})} - 1)}\right),$$

where $I_{PSF}$ is the point spread function image, $I_{bgc}$ is the background-corrected image, and $I_{wd1}$ is the deconvolved image after the first Wiener deconvolution. Second, the second Wiener deconvolution is performed on the restored image based on Equation 14 below:

$$I_{wd2} = IFFT\left(\frac{conj(FFT(I_{PSF})) \cdot FFT(I_{wd1})}{|FFT(I_{PSF})^2| + 1/(\sqrt{FFT(I_{wd1})} - 1)}\right),$$

where $I_{wd1}$ is the deconvolved image of previous step and $I_{wd2}$ is the deconvolved image after the second Wiener deconvolution.

Figure 9G:
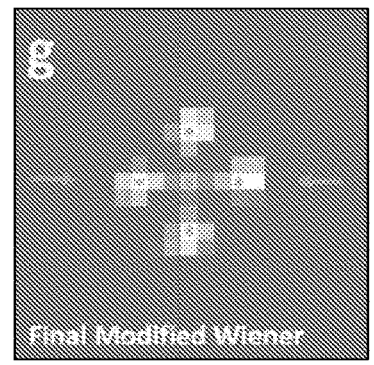

Although double-iteration Wiener deconvolution as just described greatly improves the image contrast and resolution, it introduces strong artifacts. Fortunately, these artifacts are mainly distributed in the regions without emitter signals. Thus, those artifacts may be eliminate by performing a weighting mask (e.g., as shown in FIG. 9(F)). Thus, following step 56, the method proceeds to step 58. At step 58, emitter localization component 39 applies the weighting mask (FIG. 9(F)) to each frame of the doubly deconvolved image stack to thereby create a weight adjusted doubly deconvolved image stack. FIG. 9(G) shows an exemplary frame from the weight adjusted doubly deconvolved image stack showing the five emitters. In the exemplary embodiment, the mask is implemented such that only pixels in each frame with emitter signals of larger than a threshold value are counted as valid pixels, and the intensity of all other pixels are set to be 0, as described in Equation 15 as follows: $I_{wd2}$ ($I_{bgc}$<threshold)=0. Note that the threshold may be adjusted according to the emitter intensity. For bright emitters (e.g., Alexa Fluor 647), a threshold value of 100 may be used, while for dim emitters (e.g., mEoS3.2), a smaller threshold value (e.g., 40) may be used. Next, at step 60, emitter localization component 39 determines the rough position of each of a plurality of overlapping emitters in each frame of the weight adjusted doubly deconvolved image stack. In particular, in the exemplary embodiment, the overlapping emitters are identified by finding local maxima, and the rough positions of each overlapped emitter is estimated by calculating the center of mass.

Figure 10:
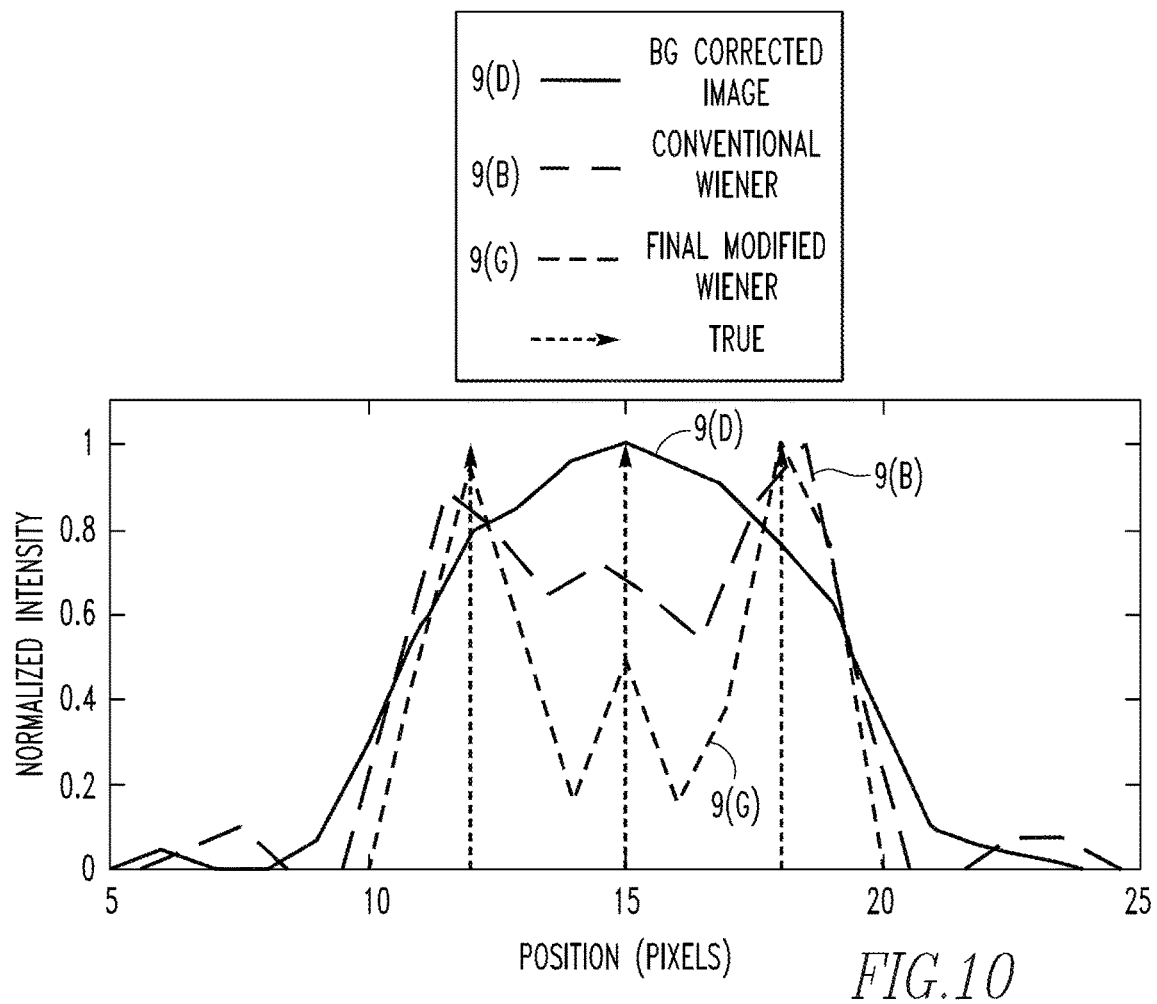
FIG. 10 shows the intensity profiles of the conventional Wiener deconvolution image, and the modified Wiener deconvolution image, together with the ground truth, according to one particular exemplary embodiment.

FIG. 10 shows the intensity profiles of the conventional Wiener deconvolution image (FIG. 9(B), the background-corrected image (FIG. 9(D)), and the modified Wiener deconvolution image (FIG. 9(D)), together with the ground truth, according to one particular exemplary embodiment.

At the conclusion of step 60, the first portion or first step of the emitter localization algorithm of the first exemplary embodiment of the disclosed concept (the modified Wiener deconvolution portion) is completed. Thus, following step 60, the method proceeds to step 62 (FIG. 8(B)), for commencement of the second portion or second step of the emitter localization algorithm of the disclosed concept (the modified gradient fitting portion).

Figure 11:
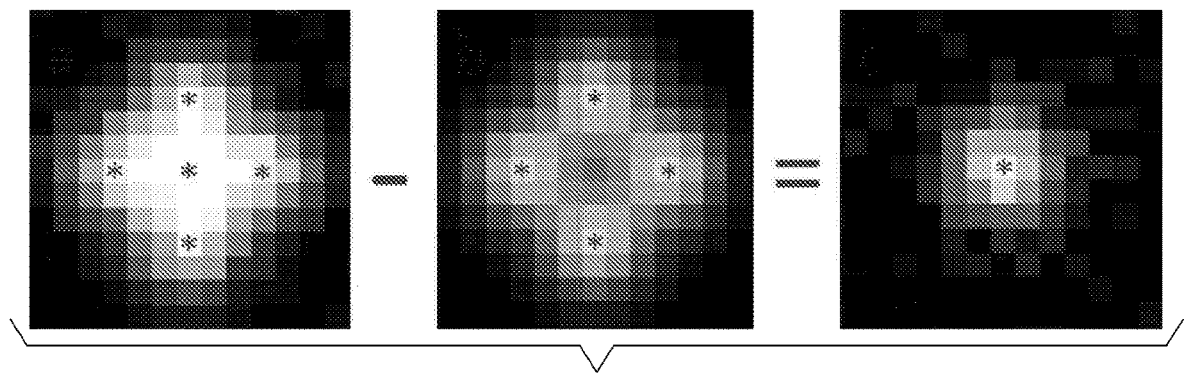
FIG. 11 illustrates creation of a modified ROI from a ROI according to one particular exemplary embodiment.

Referring to FIG. 8(B), at step 62, emitter localization component 39 identifies, for each frame of the background corrected raw image stack, a plurality of regions of interest within the frame. Next, at step 64, the emitter localization component 39 performs the following steps for each ROI of each frame: (1) obtain the determined rough position (step 60) of a predetermined number (e.g., five) of overlapping emitters with the ROI; (2) create a modified ROI from the ROI by identifying a central one of the overlapping emitters within the ROI and subtracting the intensity of the surrounding ones (i.e., surrounding the central one) of the overlapping emitters within the ROI (this step is illustrated in FIG. 11); and (3) perform gradient fitting on the modified ROI and the central one of the overlapping emitters within the modified ROI to determine a more precise position of the central one of the overlapping emitters. In the exemplary embodiment, the gradient fitting is performed as described in detail in Ma, H. et al. Fast and Precise 3D Fluorophore Localization based on Gradient Fitting. Sci. Rep. 5, 14335 (2015). Finally, at step 66, the emitter localization component 39 outputs, for each frame of the background corrected raw image stack, the determined precise position for each central one of the overlapping emitters for use in subsequent localization microscopy processing.

In one exemplary embodiment, the intensity of each emitter may be estimated according to the estimated positions of the emitters in each ROI via the following Equation 16:

$$\begin{cases} A = P/V, \text{ where} \\ P(m, n) = \sum_{i=-1}^{1}\sum_{j=-1}^{1} \exp\left(-\left((x_m - x_n + i)^2 + (y_m - y_n + j)^2\right)\right)/(2\sigma^2) \\ V(m) = \sum_{i=-1}^{1}\sum_{j=-1}^{1} I_{bgc}(X_m + i, Y_m + j) \end{cases},$$

where $I_{bgc}$ is the background corrected raw image stack, σ is the kernel width of the point spread function; $(x_m, y_m)$ and $(x_n, y_n)$ are the sub-pixel position of the $m^{th}$ and $n^{th}$ emitter, respectively; $(X_m, Y_m)$ is the pixel position of the $m^{th}$ emitter; and A is the estimated peak intensity of the overlapping emitters. In the exemplary embodiment, the maximum number of emitters in each ROI (e.g., 13×13 pixels) is set as be five. In addition, according the estimated intensity $(A_m)$ and position $(x_m, y_m)$, the intensity from the $m^{th}$ emitter at pixel (i, j) can be estimated via the following Equation 17:

$$E_m(i,j)=A(m)\cdot\exp(-((x_m-i)^2+(y_m-j)^2))/(2\sigma^2).$$

As noted above, first step of the emitter localization technique of this aspect of the disclosed concept, which identifies a number of overlapping emitters and roughly estimates their central positions, may be performed according to a second exemplary embodiment that employs a regularized inverse deconvolution rather than a modified Wiener deconvolution as just described. That second exemplary embodiment will now be described in connection with FIG. 12, which is a flowchart showing that second exemplary embodiment (which may be implemented in emitter localization component 39) and which may be employed in place of the method shown in FIG. 8(A).

Figure 12:
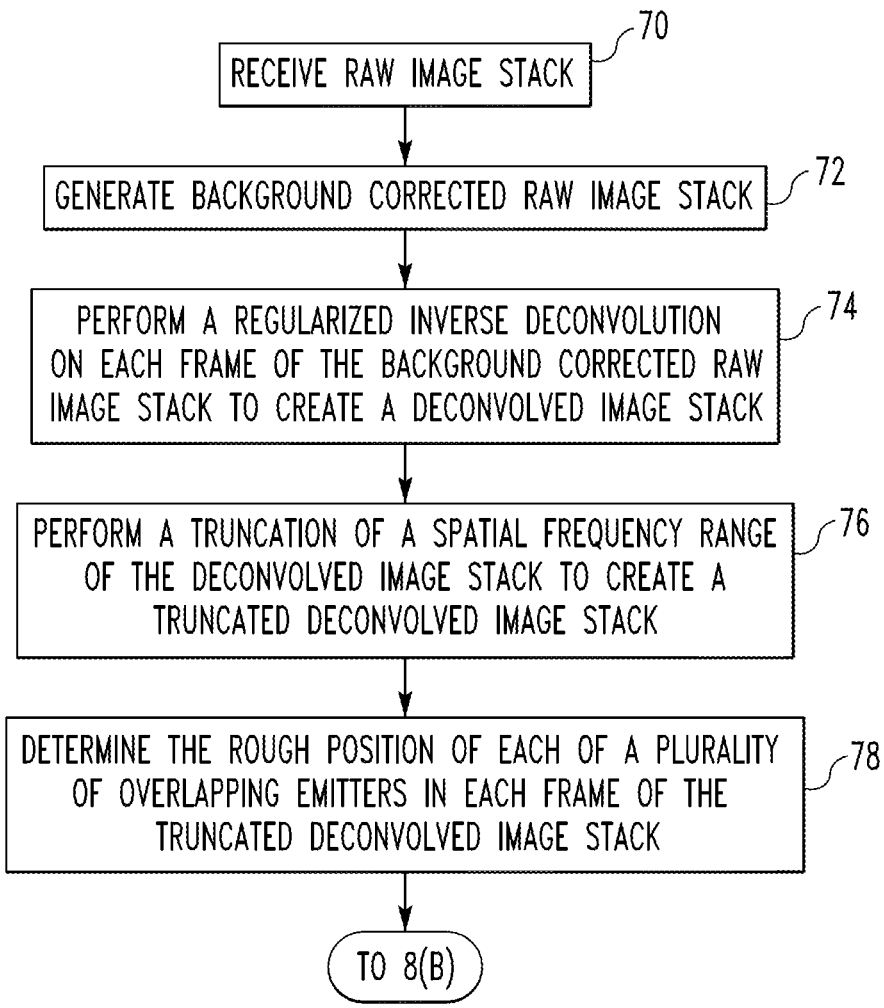
FIG. 12 is a flowchart showing a second exemplary embodiment which may be employed in place of the method shown in FIG. 8($a$)

Referring to FIG. 12, the method begins at step 70, wherein camera 30 captures a raw image stack as described herein of/from sample 4 and provides the raw image stack to control system 22 (and specifically to emitter localization component 39 of processing apparatus 36. Next, at step 72, emitter localization component 39 generates a background corrected raw image stack from the received raw image stack. In other words, at step 72, emitter localization component 39 performs background correction on the received raw image stack to account for and subtract estimated and/or expected background fluorescence values from the received raw image stack. In the exemplary embodiment, this is done using the method of FIG. 3 described herein (using background correction component 38), although it will be appreciated that other methods may also be used.

Next, at step 74, emitter localization component 39 performs a regularized inverse deconvolution on each frame of the background corrected raw image stack to create a deconvolved image stack. Specifically, this step may be performed according to the following equation 18: $D=I_c \otimes F$, where D is the deconvolved image stack, $I_c$ is the background corrected raw image stack, and F is the regularized inverse deconvolution function. $D=I_c \otimes F$. The function F can simply be described in the frequency domain (u, v) as equation 19: $F(u,v)=H^{-1}(u,v)$, where H is the point spread function of the microscope.

Figure 13A:
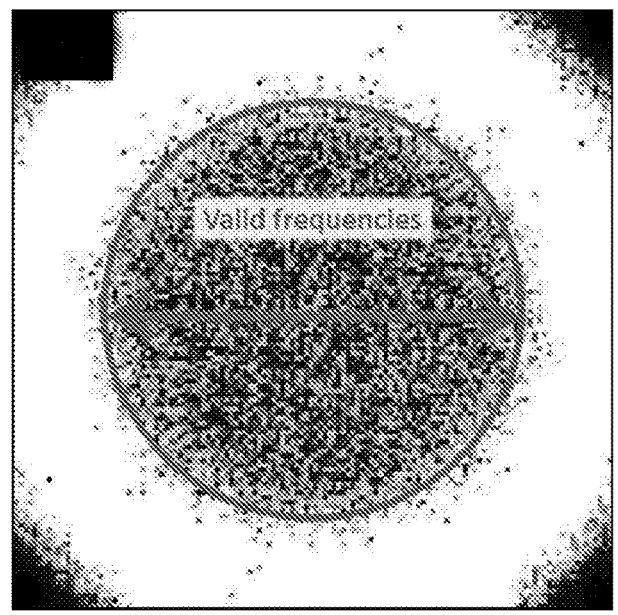
FIGS. 13(A) and 13(B) illustrate how the deconvolved image sack D(u, v) at high spatial frequency range dominates the signals in one exemplary embodiment.
Figure 13B:
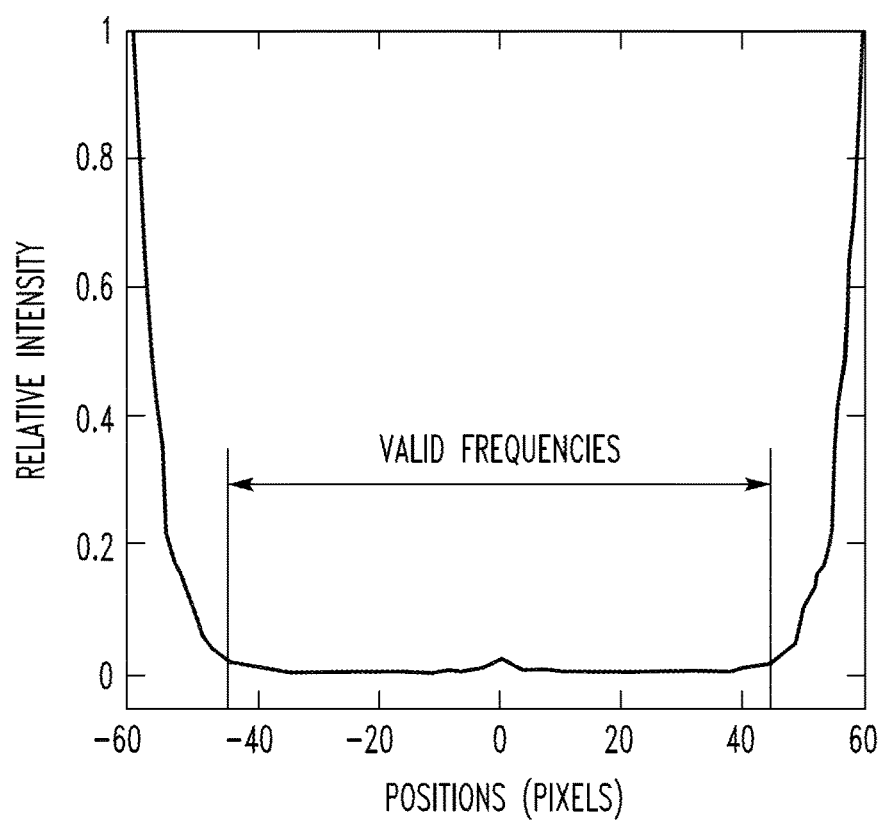

As shown in FIGS. 13(A) and 13(B) the deconvolved image sack D(u, v) at high spatial frequency range dominates the signals. Therefore, at step 76, a truncation of the high spatial frequency range of the deconvolved image stack is performed to create a truncated deconvolved image stack (this truncates the high-frequency noise in the deconvolved image to further remove artifacts). The truncation of the spatial frequencies to remove high-frequency noise in the deconvolved image stack is, in the exemplary embodiment, described by the following equation 20:

$$D(u, v) = \begin{cases} D(u, v), & |(u, v)| \le t \\ 0, & |(u, v)| > t \end{cases},$$

where the frequency cutoff is determined as the point where H undergoes a dramatic increase which often occurs at $|H(t)|=0.015\times|H(0,0)|$ This intensity weighting removes most artifacts in the deconvolved image stack.

After steps 74 and 76, the overlapping emitters are well separated. The method then proceeds to step 78, wherein the rough position of each of a plurality of overlapping emitters in each frame of the truncated deconvolved image stack is determined. Specifically, as described elsewhere herein, such rough positions can be identified by finding local maxima, and approximating position by calculating the center of mass. In the exemplary embodiment, to individual find emitters, a threshold is performed to avoid artifact caused by dim emitters. For datasets with bright emitters (e.g., Alexa 647), the threshold may be set as 3 times of the square root of the estimated background plus the peak intensity of the dimmest emitter. For datasets with weak emitters (e.g., mEoS3.2), a 3×3 average filter may be used for denoising and the threshold may be set as the square root of the estimated background plus the peak intensity of the dimmest emitter. The intensity of the dimmest emitter is determined as a quarter of the average photon counts. Following step 78, the method then proceeds to FIG. 8(B) describes in detail herein for commencement of the second portion or second step of the emitter localization algorithm of the disclosed concept (the modified gradient fitting portion).

In the claims, any reference signs placed between parentheses shall not be construed as limiting the claim. The word "comprising" or "including" does not exclude the presence of elements or steps other than those listed in a claim. In a device claim enumerating several means, several of these means may be embodied by one and the same item of hardware. The word "a" or "an" preceding an element does not exclude the presence of a plurality of such elements. In any device claim enumerating several means, several of these means may be embodied by one and the same item of hardware. The mere fact that certain elements are recited in mutually different dependent claims does not indicate that these elements cannot be used in combination.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A background correction method for a fluorescence microscopy system, comprising:
   receiving a raw image stack generated by the fluorescence microscopy system, the raw image stack having a plurality of pixel locations associated therewith and comprising a plurality of temporally spaced image frames of a sample;
   determining a number of temporal minimum intensity values for each pixel location from the raw image stack, wherein each temporal minimum intensity value for each pixel location from the raw image stack is a physical photon count;
   calculating an expected background value for each pixel location based on the number of temporal minimum intensity values for the pixel location; and
   generating a background corrected raw image stack based on the raw image shack and each expected background value.

2. The method according to claim 1, wherein the determining the number of temporal minimum intensity values for each pixel location from the raw image stack comprises:
   segmenting the raw image stack into a number of sub-stacks each including a respective plurality of the temporally spaced image frames; and
   for each sub-stack, calculating a minimum pixel intensity value for each pixel location along a temporal axis.

3. The method according to claim 2, wherein the number of temporal minimum intensity values for each pixel location is an average minimum intensity value for the pixel location comprising an average of the minimum pixel intensity value calculated for the pixel location for each of the plurality of sub-stacks.

4. The method according to claim 2, wherein each temporally spaced image frame in the raw image stack has an intensity value for each pixel location, and wherein the method includes transforming each intensity value from a digital count to a physical photon count.

5. The method according to claim 1, wherein the calculating the expected background value for each pixel location based on the number of temporal minimum intensity values for the pixel location employs a derived transfer function.

6. The method according to claim 5, wherein the derived transfer function is as follows:

$$pmf_{min}(k, \lambda, N, R) = \prod_{n=0}^{n=N-1} \left(1 - CDF_{min}\left(k-1, \lambda\left(1 + (R-1)\frac{n}{N-1}\right)\right)\right) - \prod_{n=0}^{n=N-1} \left(1 - CDF_{min}\left(k, \lambda\left(1 + (R-1)\frac{n}{N-1}\right)\right)\right)$$

$$V_{MIN} = E(pmf_{min}(k, \lambda, N, R)),$$

where $\lambda$ is the expected background value at a particular pixel location of the raw image stack, where $V_{MIN}$ is the calculated sub-stack temporal minimum values at the particular pixel location of the raw image stack, where N is the frame number the sub-stacks, and where R is the temporal decay ratio of the background in the sub-stacks.

7. A computer program product including a non-transitory computer readable medium encoded with a computer program comprising program code for implementing the method of claim 1.

8. The method according to claim 1, wherein the calculating the expected background value for each pixel location employs a derived statistical-based equation to determine the expected background value from the number of temporal minimum intensity values for the pixel location.

9. The method according to claim 1, further comprising determining a rough position of each of a plurality of emitters within the raw image stack based on the background corrected raw image stack.

10. The method according to claim 9, wherein the determining the rough position of each of the plurality of emitters employs a linear deconvolution process, and wherein the method further includes determining a precise position of each of the plurality of emitters by employing the rough position of the emitter and gradient fitting.

11. A fluorescence microscopy system, comprising:
   a light source;
   a detector for capturing a raw image stack, the raw image stack having a plurality of pixel locations associated therewith and comprising a plurality of temporally spaced image frames of a sample; and
   a control system coupled to the light source and the detector, wherein the control system is structured and configured to:
   receive the raw image stack;
   determine a number of temporal minimum intensity values for each pixel location from the raw image stack, wherein each temporal minimum intensity value for each pixel location from the raw image stack is a physical photon count; and calculate an expected background value for each pixel location based on the number of temporal minimum intensity values for the pixel location.

12. The fluorescence microscopy system according to claim 11, wherein the control system is structured and configured to generate a background corrected raw image stack based on the raw image stack and each expected background value.

13. The fluorescence microscopy system according to claim 11, wherein the control system is structured and configured to determine the number of temporal minimum intensity values for each pixel location from the raw image stack by:
  segmenting the raw image stack into a number of sub-stacks each including a respective plurality of the temporally spaced image frames; and
  for each sub-stack, calculating a minimum pixel intensity value for each pixel location along a temporal axis.

14. The fluorescence microscopy system according to claim 13, wherein the number of temporal minimum intensity values for each pixel location is an average minimum intensity value for the pixel location comprising an average of the minimum pixel intensity value calculated for the pixel location for each of the plurality of subs-stacks.

15. The fluorescence microscopy system according to claim 13, wherein each temporally spaced image frame in the raw image stack has an intensity value for each pixel location, and wherein the control system is structured and configured to transform each intensity value from a digital count to a physical photon count.

16. The fluorescence microscopy system according to claim 11, wherein the control system is structured and configured to calculate the expected background value for each pixel location based on the number of temporal minimum intensity values for the pixel location employing a derived transfer function.

17. The fluorescence microscopy system according to claim 16, wherein the derived transfer function is a follows:

$$pmf_{min}(k, \lambda, N, R) = \prod_{n=0}^{n=N-1}\left(1 - CDF_{min}\left(k-1, \lambda\left(1+(R-1)\frac{n}{N-1}\right)\right)\right) -$$

$$\prod_{n=0}^{n=N-1}\left(1 - CDF_{min}\left(k, \lambda\left(1+(R-1)\frac{n}{N-1}\right)\right)\right)$$

$$V_{MIN} = E(pmf_{min}(k, \lambda, N, R)),$$

where $\lambda$ is the expected background value at a particular pixel location of the raw image stack, where $V_{MIN}$ is the calculated sub-stack minimum values at the particular pixel location of the raw image stack, where N is the frame number the sub-stacks, and where R is the decay ratio of the background in the sub-stacks.

18. The system according to claim 11, wherein the control system is configured to calculate the expected background value for each pixel location based on the number of temporal minimum intensity values for the pixel location using a derived statistical-based equation.

19. The system according to claim 12, wherein the control system is further configured to determine a rough position of each of a plurality of emitters within the raw image stack based on the background corrected raw image stack.

20. The system according to claim 19, wherein the control system is further configured to determine the rough position of each of the plurality of emitters by employing a linear deconvolution process and determine a precise position of each of the plurality of emitters by employing the rough position of the emitter and gradient fitting.

* * * * *

UNITED STATES PATENT AND TRADEMARK OFFICE
CERTIFICATE OF CORRECTION

| | | |
|---|---|---|
| PATENT NO. | : 12,044,625 B2 | |
| APPLICATION NO. | : 16/965320 | |
| DATED | : July 23, 2024 | |
| INVENTOR(S) | : Hongqiang Ma and Yang Liu | |

It is certified that error appears in the above-identified patent and that said Letters Patent is hereby corrected as shown below:

In the Claims

Column 17, Claim 1, Line 55:
After the words "on the raw image", the word "shack" should be changed to --stack--.

Signed and Sealed this
Tenth Day of September, 2024

Katherine Kelly Vidal
*Director of the United States Patent and Trademark Office*